US011150625B2

(12) United States Patent
Aizawa et al.

(10) Patent No.: US 11,150,625 B2
(45) Date of Patent: Oct. 19, 2021

(54) EVALUATION WORK PIECE AND COMPUTER-READABLE STORAGE MEDIUM

(71) Applicant: FANUC CORPORATION, Yamanashi (JP)

(72) Inventors: Nobuaki Aizawa, Yamanashi (JP); Wei Zhao, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 113 days.

(21) Appl. No.: 16/112,029

(22) Filed: Aug. 24, 2018

(65) Prior Publication Data

US 2019/0064763 A1 Feb. 28, 2019

(30) Foreign Application Priority Data

Aug. 28, 2017 (JP) .............................. JP2017-163621
Apr. 12, 2018 (JP) .............................. JP2018-076962

(51) Int. Cl.
*G05B 19/401* (2006.01)
*G05B 19/18* (2006.01)
(Continued)

(52) U.S. Cl.
CPC ......... *G05B 19/182* (2013.01); *G05B 19/401* (2013.01); *G05B 19/4099* (2013.01); *G05B 19/4141* (2013.01)

(58) Field of Classification Search
CPC ........ G05B 2219/35352; G05B 19/182; G05B 19/4141; G05B 19/4099; G05B 19/401;
(Continued)

(56) References Cited

FOREIGN PATENT DOCUMENTS

JP 2005-309673 11/2005
JP 2012-86325 5/2012

OTHER PUBLICATIONS

Barnfather, Measurement, "Photogrammetric measurement process capability for metrology assisted robotic machining", 2015. (Year: 2015).*

(Continued)

*Primary Examiner* — Eric S. McCall
*Assistant Examiner* — Timothy P Graves
(74) *Attorney, Agent, or Firm* — Wenderoth, Lind & Ponack, L.L.P.

(57) ABSTRACT

An evaluation work piece includes at least one of a part (B) or (G), and at least one of a part (A), (C), (D), (E), or (F). (A) is a vertical level difference part. (B) is a direction reversing part at which a direction of movement of a tool in a height direction is reversed when the tool is used for machining of a three-dimensional object including a curved surface. (C) is a corner part at which a direction of movement of the tool changes. (D) is a flat surface part. (E) is a boundary part between a flat surface and a curved surface with a changing curvature. (F) is a curved surface part having a curved surface with a changing curvature. (G) is a curved surface part at which command points are aligned regularly between adjacent tool paths on a curved surface. At least one of the part (B) or (G) is included in a cut spherical body part. A reference surface for a three-dimensional measuring machine is arranged around the cut spherical body part. At least one of the part (A), (C), (D), (E) or (F) is arranged outside the reference surface.

6 Claims, 19 Drawing Sheets

(51) Int. Cl.
  *G05B 19/414* (2006.01)
  *G05B 19/4099* (2006.01)
(58) Field of Classification Search
  CPC ........... G05B 2219/35012; G05B 2219/50057;
          G05B 2219/41032; G05B 19/4097
  See application file for complete search history.

(56) References Cited

OTHER PUBLICATIONS

McCarthy, NPL Freeform Artefact for Verification of Non-Contact Measuring Systems, IS&T/SPIE Electronic Imaging, 2011 (Year: 2011).*
Lopez de Lacalle, Machine Tools for High Performance Machining, 2009, Springer, p. 257-258 (Year: 2009).*
Notification of Reasons for Refusal dated Oct. 29, 2019 in Japanese Patent Application No. 2018-076962.
M. Weck et al: Machine tools 5: Metrological Investigation and assessment, Springer Vieweg 2006, 9.2.2 Test pieces for determining machine-typical Error, pp. 421-426.
Office Action dated Nov. 23, 2020 in German Patent Application No. DE 10 2018 214 072.3, with Machine Translation.
Office Action dated Aug. 3, 2021 in corresponding Chinese Patent Application No. 201810975269.X.
A. Lamikiz et al., "Machine Tools for High Performance Machining—Chapter 6: Machine Tool Performance and Precision", 2009, pp. 219-260.

* cited by examiner

EVALUATION WORK PIECE AND COMPUTER-READABLE STORAGE MEDIUM

This application is based on and claims the benefit of priority from Japanese Patent Application No. 2017-163621, filed on 28 Aug. 2017 and Japanese Patent Application No. 2018-076962, filed on 12 Apr. 2018, the content of which is incorporated herein by reference.

BACKGROUND OF THE INVENTION

Field of the Invention

The present invention relates to an evaluation work piece machined by a machine tool and a computer-readable storage medium.

Related Art

A method of evaluating displacement of a machine tool using an evaluation work piece is described in patent document 1, for example. In the method of evaluating displacement of the machine tool described in patent document 1, a displacement evaluation work piece having a grooving surface is installed for a machine tool having an X axis, a Y axis, and a Z axis perpendicular to each other in such a manner that the grooving surface is tilted from the X-axis direction and a side of the grooving surface at one end side is parallel to the Y-axis direction, for example. In the displacement evaluation method for the machine tool, while the displacement evaluation work piece is installed, a tool is moved in the X-axis direction without being moved in the Z-axis direction to perform grooving of forming a linear groove in the grooving surface. This grooving is performed each time the tool is moved sequentially in the Y-axis direction so as to form parallel linear grooves in corresponding lines, thereby evaluating displacement in the Z-axis direction.

Patent Document 1: Japanese Unexamined Patent Application, Publication No. 2012-86325

SUMMARY OF THE INVENTION

Machining by the machine tool is influenced by various factors such as a machining program, a numerical controller, a servo controller, a tool, and a machining condition. An evaluation work piece for evaluating influence by these factors over machining has been desired.

The present invention is intended to provide an evaluation work piece and a computer-readable storage medium for evaluating influence by various factors such as a machining program, a numerical controller, a servo controller, a tool, and a machining condition over machining by a machine tool.

(1) An evaluation work piece according to the present invention is an evaluation work piece (evaluation work piece 10 or 70 described later, for example) comprising at least one of parts (A) to (G) as follows on a surface machined machine tool:

(A) a vertic level difference part (vertic level difference part 11 described later, for example) having a vertical level difference, and flat surfaces arranged on both sides of the vertical level difference;

(B) a direction reversing part (direction reversing part 12 described later, for example) at which a direction of movement of a tool in a eight direction is reversed when the tool is used for machining of a three-dimensional object including a curved surface;

(C) a corner part (corner part 13 described later, for example) at which a direction of movement of the tool changes;

(D) a flat surface part (flat surface part 14 described later, for example);

(E) a boundary part (boundary part 15 described later, for example) between a flat surface and a curved surface with a changing curvature;

(F) a curved surface part (curved surface part 16 described later, for example) having a curved surface with a changing curvature; and (G) a curved surface part (curved surface part 17 described later, for example) at which command points are aligned regularly between adjacent tool paths on a curved surface.

(2) In the evaluation work piece described in (1), the curved surface may include a cut spherical body part, and at least one of the part (B) and the part (G) may be included in the cut spherical body part.

(3) In the evaluation work piece described in (2), the cut spherical body part may be arranged in a central area of the evaluation work piece.

(4) In the evaluation work piece described in (3) a ring-like reference surface for a three-dimensional measuring machine may be arranged around the cut spherical body part.

(5) In the evaluation work piece described in any one of (1) to (4), the evaluation work piece may be configured using a rectangular substrate, and the part (C) may be arranged at a corner of the substrate.

(6) In the evaluation work piece described in any one of (1) to (5), the part (D) may be arranged along the exterior of the evaluation work piece.

(7) The evaluation work piece described in any one of (1) to (6) may comprise at least one of the parts (A) to (G) and at least one inverted shape part having, a concavo-convex shape inverted from a concavo-convex shape of the at least one part, wherein the part and the inverted shape part may be arranged symmetrically about a reference line on a surface of a substrate.

(8) A non-transitory computer-readable storage medium according to the present invention is a non-transitory storage medium storing a machining program for causing a computer as a numerical controller (numerical controller 300 described later, for example) that produces an evaluation work piece (evaluation work piece 10 or 70 described later, for example) by driving a machine tool to perform at least one of processes (a) to (g) as follows:

(a) a process of decelerating a tool when the tool moves along a lower flat surface toward a vertical level difference, accelerating and decelerating the tool at the vertical level difference, and accelerating the tool when the tool moves along an upper flat surface from the vertical level difference, and a process of decelerating the tool when the tool moves along the upper flat surface toward the vertical level difference, accelerating and decelerating the tool at the vertical level difference, and accelerating the tool when the tool moves along the lower flat surface from the vertical level difference;

(b) a process of reversing a direction of movement of the tool in a height direction when the tool is used for machining of a three-dimensional object including a curved surface;

(c) a process of changing a direction of movement of the tool at a corner part;

(d) a process of moving the tool at a flat surface part;

(e) a process of reciprocating the tool at a boundary part between a flat surface and a curved surface with a changing curvature;
(f) a process of reciprocating the tool at a curved surface part having a curved surface with a changing curvature; and
(g) a process of reciprocating the tool in such a manner that command points are aligned regularly between adjacent tool paths on a curved surface.

(9) In the non-transitory computer-readable storage medium described in (8), the curved surface may include a cut spherical body part, and at least one of the process (b) and the process (g) may be performed.

(10) In the non-transitory computer-readable storage medium described in (9), the cut spherical body part may be arranged in a central area of the evaluation work piece.

(11) In the non-transitory computer-readable storage medium described in (10), a ring-like reference surface for a three-dimensional measuring machine may be formed around the cut spherical body part.

(12) In the non-transitory computer-readable storage medium described in any one of (8) to (11), the evaluation work piece may be configured using a rectangular substrate and the corner part in the process (c) may be arranged at a corner of the substrate.

(13) In the non-transitory computer-readable storage medium described in any one of (8) to (12), the flat surface part in the process (d) may be arranged along the exterior of the evaluation work piece.

(14) The non-transitory computer-readable storage medium described in any one of (8) to (13) may comprise at least one of the processes (a) to (g) and a process of producing at least one inverted shape part having a concavo-convex shape inverted from a concavo-convex shape of a part produced by the at least one process, wherein the computer may be caused to perform the at least one process and the process of producing the at least one inverted shape part so as to arrange the part and the inverted shape part symmetrically about a reference line on a surface of a substrate.

(15) A non-transitory computer-readable storage medium according to the present invention is a non-transitory computer-readable storage medium storing a data structure for CAD data for use in a control system (control system 60 described later, for example) for a machine tool that produces an evaluation work piece (evaluation work piece 10 described later, for example) by generating a machining program based on the CAD data and driving the machine tool, the data structure being for machining at least one of parts (A) to (G) of the evaluation work piece as follows:
(A) a vertical level difference part having a vertical level difference and flat surfaces arranged on both sides of the vertical level difference;
(B) a direction reversing part at which a direction of movement of a tool in a height direction is reversed when the tool is used for machining of a three-dimensional object including a curved surface;
(C) a corner part at which a direction of movement of the tool changes;
(D) a flat surface part;
(E) a boundary part between a flat surface and a curved surface with a changing curvature;
(F) a curved surface part having a curved surface with a changing curvature; and
(G) a curved surface part at which command points are aligned regularly between adjacent tool paths on a curved surface.

(16) In the non-transitory computer-readable storage medium described in (15), the data structure may be for machining the evaluation work piece in such a manner that at least one of the parts (A) to (G) and at least one inverted shape part having a concavo-convex shape inverted from a concavo-convex shape of the at least one part are arranged symmetrically about a reference line on a surface of a substrate.

The present invention is capable of evaluating influence by various factors such as a machining, program, a numerical controller, a servo controller, a tool, and a machining condition over machining by a machine tool.

DETAILED DESCRIPTION OF THE INVENTION

Figure 1:
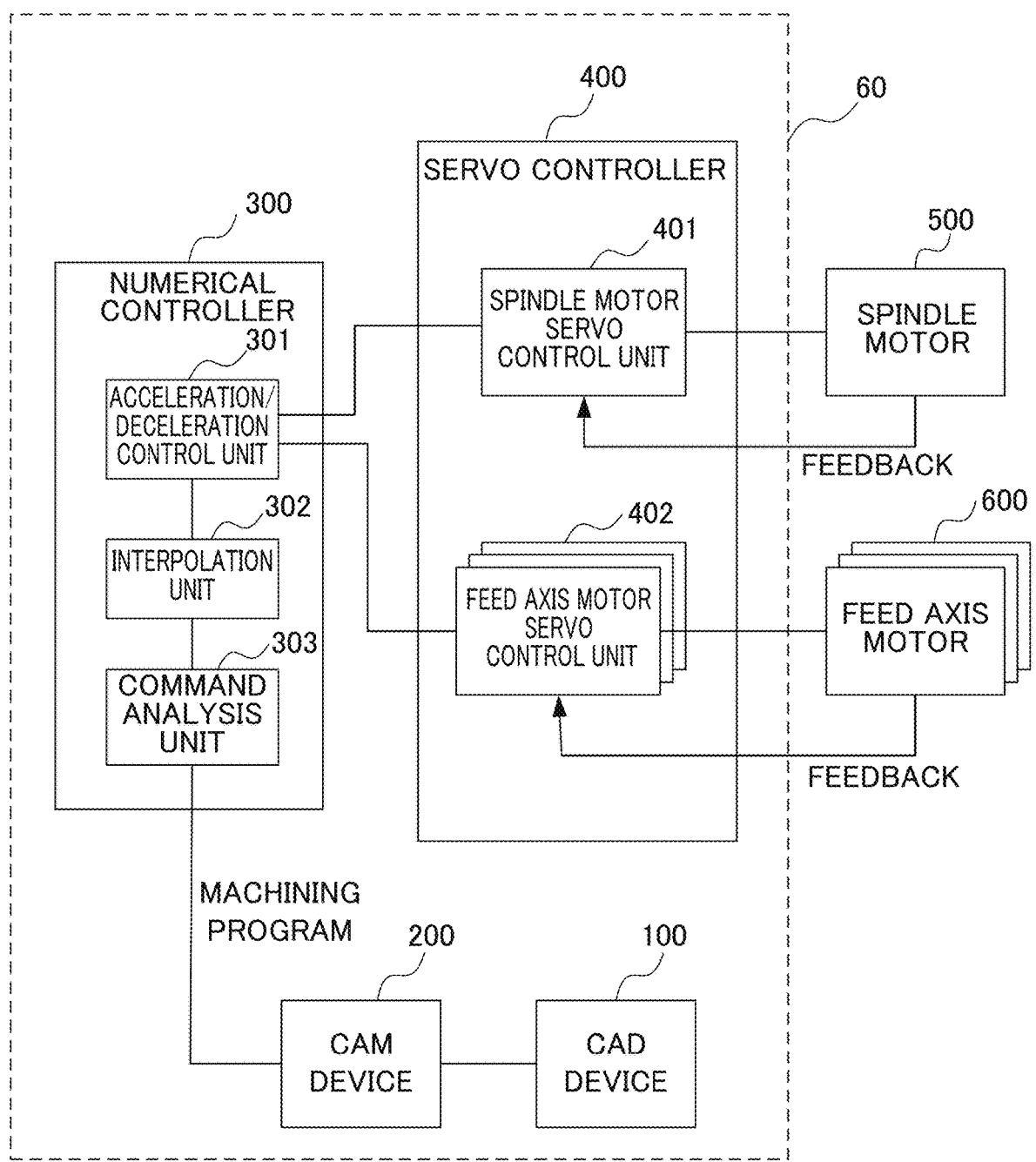
FIG. 1 is a block diagram showing the configuration of a control system for a machine tool that produces an evaluation work piece 10.

Embodiments of the present invention will be described below by referring to the drawings.

First Embodiment

A control system for a machine tool that produces an evaluation work piece according to the present invention will be described first. FIG. 1 is a block diagram showing the configuration of the control system for the machine tool that produces the evaluation work piece. The configuration of the evaluation work piece will be described later. As shown in FIG. 1, a control system 60 for a machine tool that produces an evaluation work piece 10 includes a computer-aided design (CAD) device 100, a computer-aided manufacturing (CAM) device 200, a numerical controller 300, and a servo controller 400.

The machine tool is a three-axis machine, for example. In FIG. 1, only a spindle motor 500 and a feed axis motor 600 are shown. The spindle motor 500 rotates a tool such as a ball end mill. The feed axis motor 600 includes three motors, an X-axis direction motor, a Y-axis direction motor, and a Z-axis direction motor. The X-axis direction motor and the Y-axis direction motor move a table on which a substrate for production of an evaluation work piece linearly in the X-axis direction and the Y-axis direction respectively through ball screws, for example. The Z-axis direction motor moves the tool or the table linearly in the Z-axis direction. This is not the only configuration of the three-axis machine. The three axis machine may be configured to move the table linearly in the X-axis direction, the Y-axis direction, and the Z-axis direction while the tool is fixed, or to move the tool linearly in the X-axis direction, the Y-axis direction, and the Z-axis direction while the table is fixed, for example.

The CAD device 100 operates CAD software for drafting on a computer screen using a CPU. The drawing of an evaluation work piece is made through two-dimensional CAD or three-dimensional CAD. If the CAD device 100 uses two-dimensional CAD, the CAD device 100 makes a front view, a top view, a side view, etc. of the evaluation work piece 10 on the XY plane. If the CAD device 100 uses three-dimensional CAD, the CAD device 100 makes a three-dimensional image of the evaluation work piece on the XYZ three-dimensional space.

The CAM device 200 operates CAM software for generating a machining program on a computer using the CPU based on the shape of the evaluation work piece made by the CAD device 100.

The numerical controller 300 includes an acceleration/deceleration control unit 301, an interpolation unit 302, and a command analysis unit 303. The command analysis unit 303 reads blocks sequentially containing commands for movement along the X axis, movement along the Y axis, and movement along Z axis from the machining program generated by the CAM device 200, and analyzes the read blocks. Based on a result of the analysis, the command analysis unit 303 generates movement command data containing, a command for movement along each axis and outputs the generated movement command data to the interpolation unit 302.

Based on the command for movement contained in the movement command data output from the command analysis unit 303, the interpolation unit 302 generates interpolated data by calculating points on a command path by interpolation in an interpolation cycle. Based on the interpolated data output from the interpolation unit 302, the acceleration/deceleration control unit 301 performs acceleration/deceleration processing to calculate the speed along each axis in each interpolation cycle, and outputs data based on a result of the calculation to a spindle motor servo control unit 401 the servo controller 400, and three feed axis motor servo control units 402 corresponding to the X axis, the Y axis, and the Z axis.

The spindle motor servo control unit 401 controls the spindle motor 500 based on the output from the acceleration/deceleration control unit 301. The three feed axis motor servo control units 402 corresponding to the X axis, the Y axis, and the Z axis control the three feed axis motors 600 corresponding to the X axis, the Y axis, and the Z axis based on the output from the acceleration/deceleration control unit 301. The spindle motor servo control unit 401 and the three feed axis motor servo control units 402 each include a position control unit and a speed control unit for forming a position feedback loop and a speed feedback loop respectively, a motor drive amplifier that drives a spindle motor or a feed axis motor based on a torque command value, and an operator's panel for receiving an operation from a user, etc.

The spindle motor servo control unit 401 calculates a backlash compensation value using a position feedback signal from a position detector such as an encoder connected to the spindle motor 500 and a position command output from the numerical controller 300 and modifies the position command. Each of the three feed axis motor servo control units 402 calculates a backlash compensation value using a position feedback signal from a position detector such as an encoder connected to a corresponding one of the three feed axis motors 600 and a position command output from the numerical controller 300 and modifies the position command. As the spindle motor servo control unit 401 and the three feed axis motor servo control units 402 have an internal configuration well known to a person skilled in the art, this internal configuration is not illustrated in the drawings and is not described in detail.

In the foregoing control system 60 for the machine tool, the CAD device 100 and the CAM device 200 may be integrated and configured as one computer. The CAD device 100 and the CAM device 200 may be contained in the numerical controller 300. Further, the servo controller 400 may be contained in the numerical controller 300. All the constituting units in the numerical controller (acceleration/deceleration control unit 301, interpolation unit 302, and command analysis unit 303) may be realized by hardware, software, or a combination of hardware and software. Being realized by software means being realized by the reading and execution of a program by a computer. To fulfill the functions of the acceleration/deceleration control unit 301, the interpolation unit 302, and the command analysis unit 303 using software, the numerical controller includes an arithmetic processor such as a central processing unit (CPU). The numerical controller further includes an auxiliary storage unit such as a hard disk drive (HDD) storing various control programs such as application software and an operating system (OS), and a main storage unit such as a random access memory (RAM) for storing data temporarily required for execution of a program by the arithmetic processor.

In the numerical controller, while the arithmetic processor reads application software and the OS from the auxiliary storage unit and expands the read application software and OS onto the main storage unit, the arithmetic processor performs arithmetic processing based on the expanded application software and OS. Each type of hardware in a corresponding unit is controlled based on a result of the arithmetic processing. In this way, the functional blocks of this embodiment are realized. Specifically, this embodiment becomes feasible by cooperative action of hardware and software.

Figure 2:
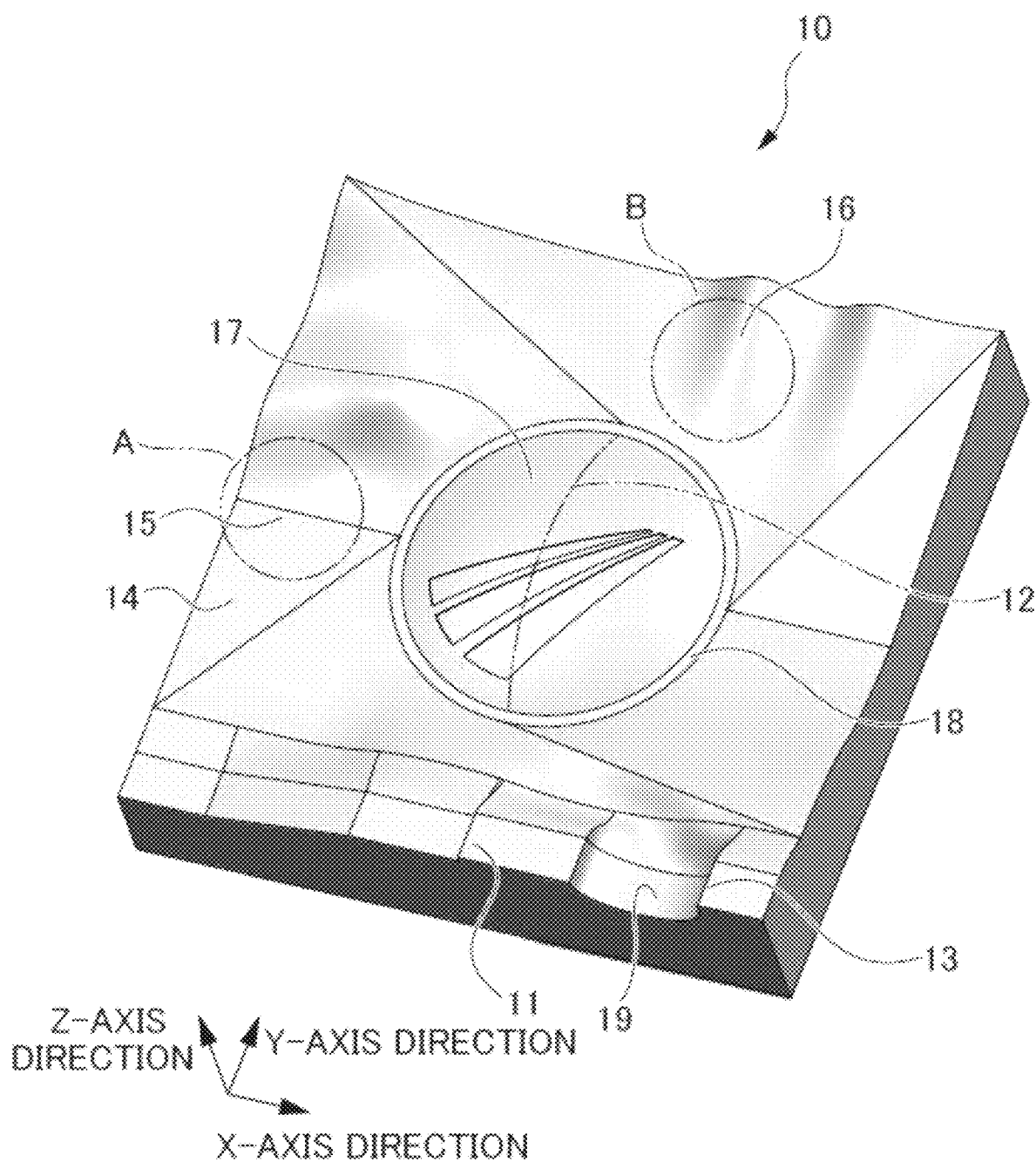
FIG. 2 is a perspective view showing a front side of an evaluation work piece according to an embodiment of the present invention.
Figure 3:
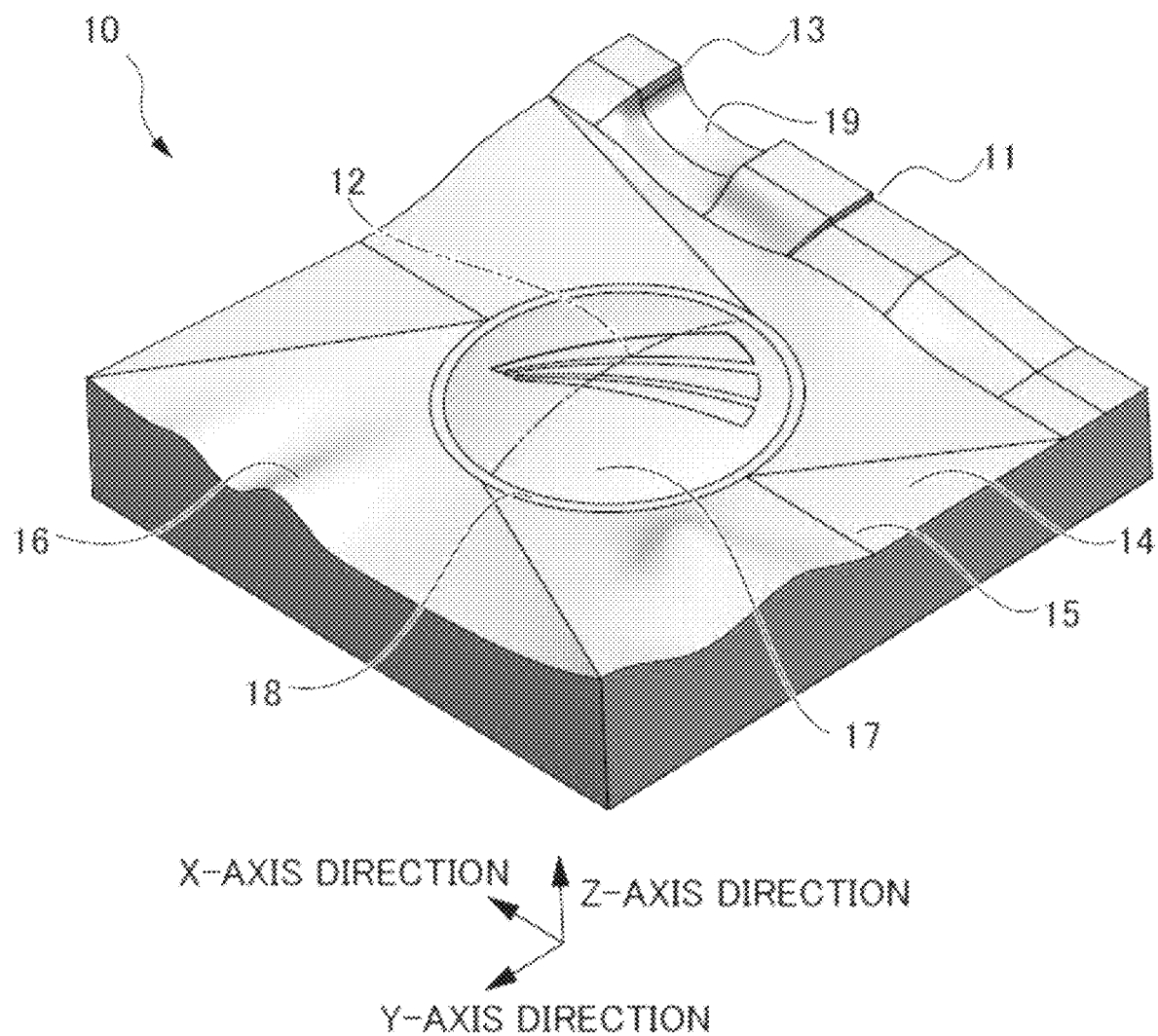
FIG. 3 is a perspective view showing a back side of the evaluation work piece according to the embodiment of the present invention.

An evaluation work piece according to the embodiment of the present invention machined using the control system 60 for the machine tool will be described next. The evaluation work piece of this embodiment includes seven evaluation parts for allowing measurements in seven evaluation items. FIG. 2 is a perspective view showing a front side of the evaluation work piece according to the embodiment of the present invention. FIG. 3 is a perspective view showing a back side of the evaluation work piece according to the embodiment of the present invention. As shown in FIGS. 2 and 3, the evaluation work piece 10 includes a vertical level difference part 11 having a vertical level difference, a direction reversing part 12 extending in the direction of Z-axis movement of a tool at a cut sphere, a corner part 13, a triangular flat surface part 14, a boundary part 15 between a flat surface and a curved surface to generate a reciprocating path level difference, a curved surface part 16 to generate a reciprocating path level difference, and a curved surface part 17 at the cut sphere. In this embodiment, the evaluation work piece 10 is described as having a square shape. However, the shape of the evaluation work piece 10 is not particularly limited to a square and different shapes such as a rectangle are applicable. Here, the size of the square is 100 mm×100 mm. However, the square is not particularly limited to this size and may have any size. The evaluation work piece 10 is produced by a machine (three-axis machine or five-axis machine, for example) required at least to perform three-axis machining (including X-axis machining, Y-axis machining, and Z-axis machining) simultaneously. A ball end mill is usable as a tool, for example. The vertical level difference part 11, the direction reversing part 12, the corner part 13, the flat surface part 14, the boundary part 15 between a flat surface and a curved surface, the curved surface part 16, and the curved surface part 17 form seven evaluation parts. Each evaluation part will be described below.

<Vertical Level Difference Part 11>

If the evaluation work piece 10 has a vertical level difference in the Z-axis direction, a direction of movement of the tool changes rapidly. If a direction of movement of the tool changes from the X-axis direction to the Z-axis direction, for example, reducing vibration of a machine is required by decelerating a feed axis in the X-axis direction. However, improper setting of acceleration/deceleration about the feed axis in the X-axis direction causes vibration at the machine to vibrate the tool, causing tiny vertical intervals at a machining surface.

Figure 4:
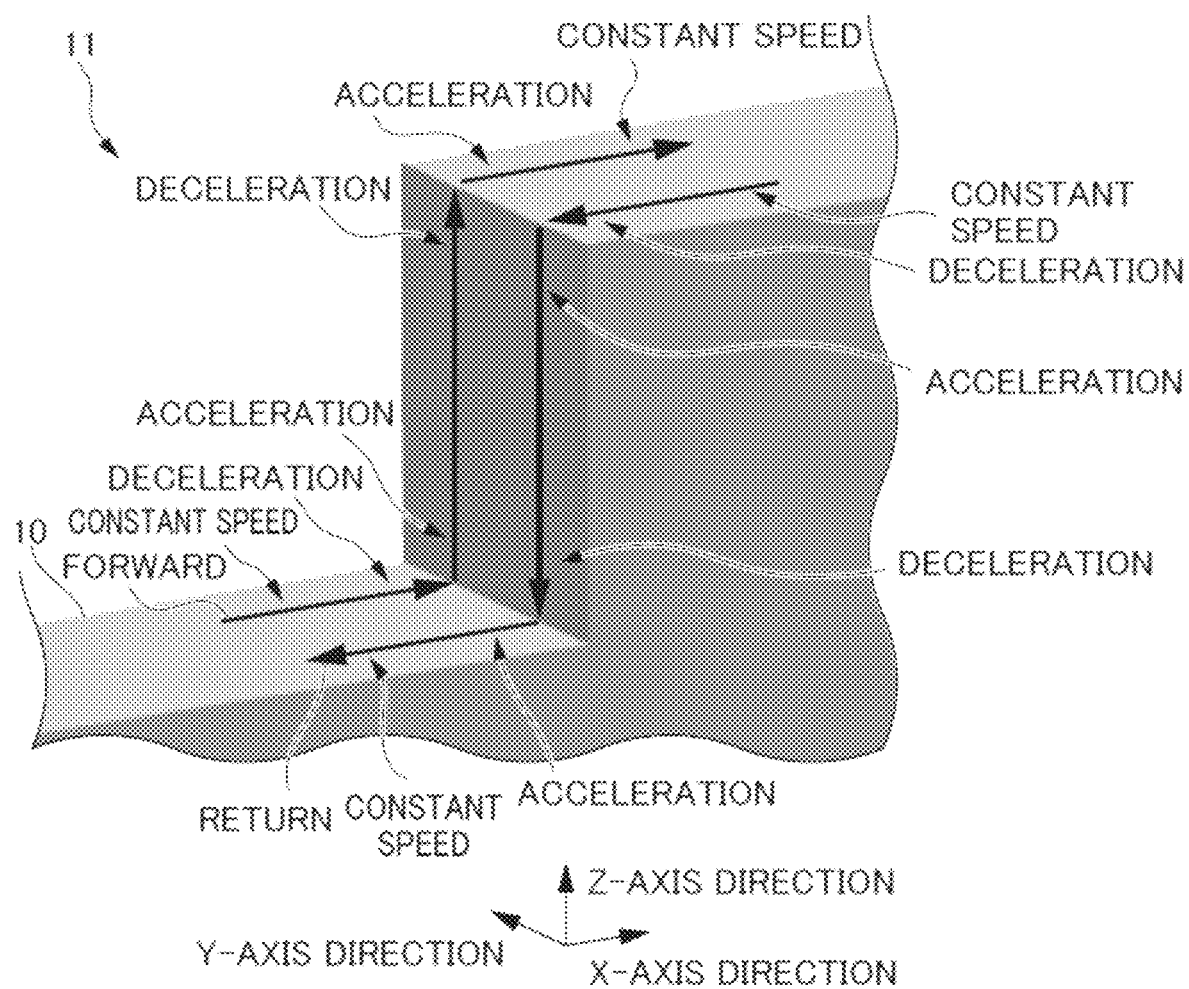
FIG. 4 is a perspective view explaining machining at a vertical level difference part of the evaluation work piece of this embodiment.
Figure 5:
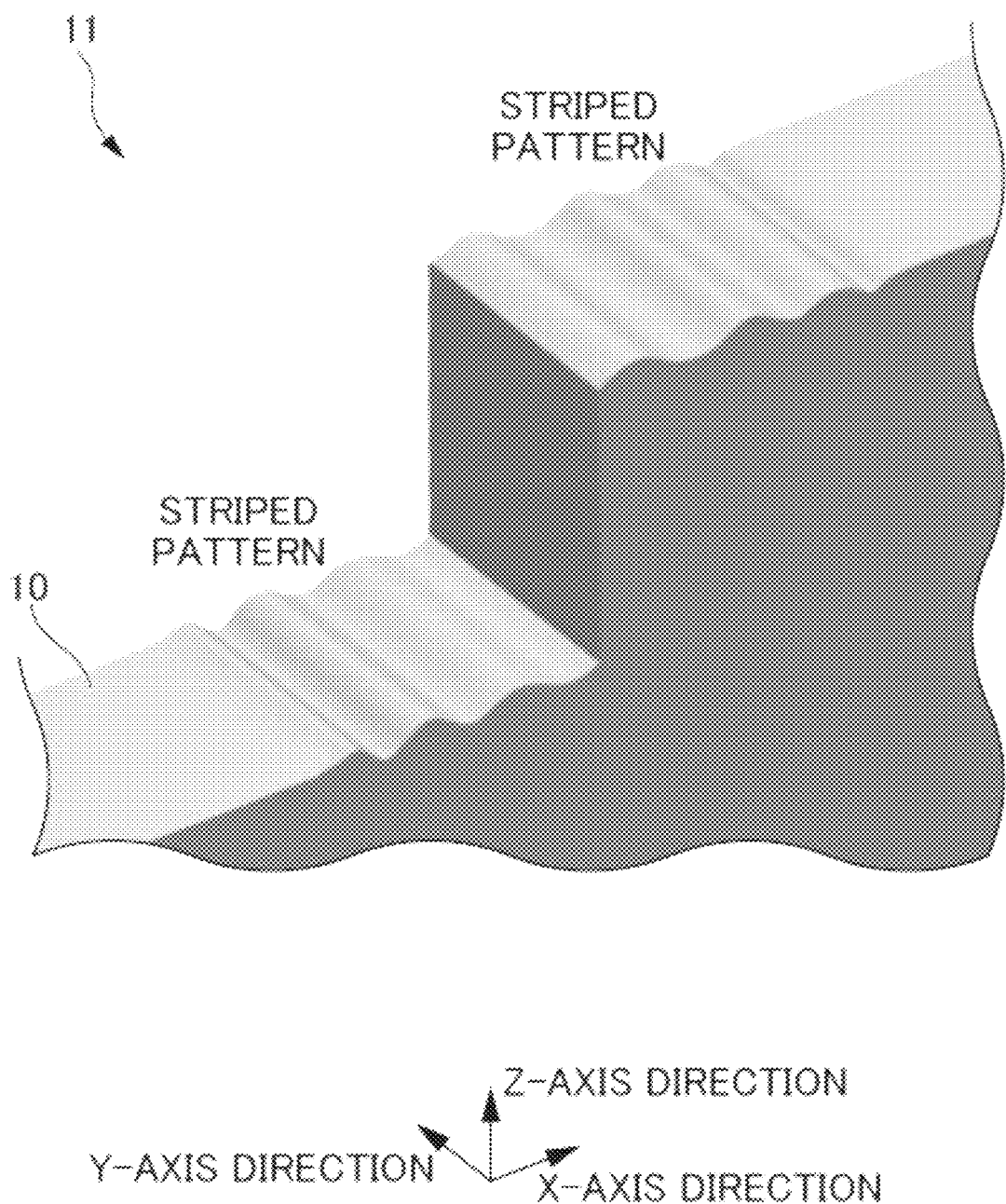
FIG. 5 is a perspective view showing a state where striped patterns occur at flat surfaces on both sides of a vertical level difference of the evaluation work piece of this embodiment.

The vertical level difference part 11 of the evaluation work piece 10 according to this embodiment includes a vertical level difference, and two flat surfaces arranged on both sides of the vertical level difference. FIG. 4 is a perspective view explaining machining at the vertical level difference part of the evaluation work piece of this embodiment. As shown in FIG. 4, the movement of the tool along a forward path at the vertical level difference part 11 is such that feed axis speed in the X-axis direction shifts from constant speed to reduced speed on the lower flat surface, feed axis speed in the Z-axis direction shifts from increased speed to reduced speed at the vertical level difference, and feed axis speed in the X-axis direction shifts from increased speed to constant speed on the upper flat surface. The movement of the tool along a return path is such that feed axis speed in the X-axis direction shifts from constant speed to reduced speed on the upper flat surface, feed axis speed in the Z-axis direction shifts from increased speed to reduced speed at the vertical level difference, and feed axis speed in the X-axis direction shifts from increased speed to constant speed on the lower flat surface. In the presence of the flat surfaces on both sides of the vertical level difference in the Z-axis direction, if vibration occurs at the machine at the vertical level difference during machining by a reciprocating motion of the tool as shown in FIG. 4, tiny vertical intervals occurring at the machining surface between adjacent tool paths are aligned regularly at the flat surface portions to cause striped patterns, as shown in FIG. 5. By forming the flat surfaces on both sides of the vertical level difference in the Z-axis direction, intervals between stripes (vibration cycle) are measured easily. FIG. 5 is a perspective view showing a state where the striped patterns occur at the flat surfaces on both sides of the vertical level difference of the evaluation work piece of this embodiment.

The height of the vertical level difference and an angle between a surface to generate the vertical level difference and a flat surface are not particularly limited and are freely settable. The lengths of the flat surfaces on both sides the vertical level difference in a direction at a right angle to the surface to generate the vertical level difference are set at lengths sufficient for allowing a shift from constant speed to reduced speed and a shift from increased speed to constant speed in front of and behind the vertical level difference. The widths of the flat surfaces on both sides of the vertical level difference in a direction parallel to the surface to generate the vertical level difference are set so as to facilitate observation and measurement of the striped patterns. For example, the vertical level difference may have a height of 1 mm, an angle between the vertical level difference and the flat surface may be 90 degrees, the lengths of the opposite flat surfaces may be 17 mm, and the widths of the opposite flat surfaces may be 7.5 mm. However, the dimensions are not limited to these values.

Vibration is considered to occur at the machine for the following reason from a dynamic viewpoint. Rapid speed change of a motor causes a disturbance and this disturbance is transmitted through the ball screw to the tool, table, etc. connected to the tip of the ball screw. In this way, the tool and the table are deviated from their positions of equilibrium by the disturbance. The tool and the table deviated from their positions of equilibrium by the disturbance try to return to their original positions. In this way, the tool and the table are vibrated by the disturbance. The occurrence of the striped patterns may be avoided effectively by moderating the speed change of the motor and suppressing the disturbance. The numerical controller for the machine tool exerts control for determining how speed is to be reduced at the flat surface for suppressing vibration when the tool passes the vertical level difference part including the vertical level difference in the Z-axis direction and the flat surfaces on both sides of the vertical level difference. Control for determining how speed is to be reduced to a set speed includes control for determining whether speed is to be reduced linearly or nonlinearly, and control for setting the magnitude of an acceleration and acceleration time, for example.

If speed adjustment in a machining program is constant, the properness of the setting of acceleration/deceleration by the numerical controller is evaluated based on the occurrence of a striped pattern. Further, whether a mechanical structure is likely to vibrate (whether a mechanical structure is subjected to vibration easily) can be determined, or the superiority or inferiority of the control function of the numerical controller relating acceleration (in terms of whether the control function is only for linear acceleration) can be evaluated based on whether a striped pattern becomes erasable by the setting of acceleration/deceleration made by the numerical controller.

<Direction Reversing Part 12>

If a work piece having a concavo-convex shape is machined, a direction of movement of the tool along the Z axis (vertical axis) is reversed by the shape. Backlash compensation is performed to reduce influence from a backlash at the direction reversing part. However, improper setting of the backlash compensation causes excessive or insufficient movement in the Z-axis direction to cause tiny vertical intervals at the machining surface. If vertical intervals occurring between adjacent tool paths for reciprocating machining of a mold, etc. are aligned regularly, a stripe is caused and this stripe is recognizable by the naked eye.

To form the direction reversing part 12 in the Z-axis direction, the evaluation work piece 10 of this embodiment includes a cut sphere part. In the case of improper backlash compensation, tiny vertical intervals occur at the direction reversing part 12 shown in FIGS. 2 and 3 during formation of the cut sphere part with the tool by reciprocating machining. If the vertical intervals are aligned regularly between adjacent tool paths, an arc-like stripe becomes recognizable. The backlash compensation is generally performed by the servo controller.

A machining shape to generate direction reversal is only required to be a three-dimensional shape with concavo-convex and is not particularly limited to a cut sphere, as such a three-dimensional shape generates reversal along the Z axis during machining to cause influence by the backlash. However, if the machining shape is formed into the cut sphere, the direction reversing part 12 is aligned in a straight line when viewed from above to facilitate observation.

Figure 6:
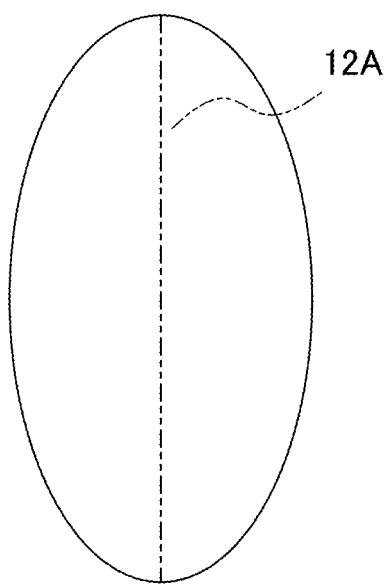
FIG. 6 is a top view showing a machining direction in a short-axis direction and a direction reversing part extending in a long-axis direction when a cut oval sphere is viewed from above.
Figure 7:
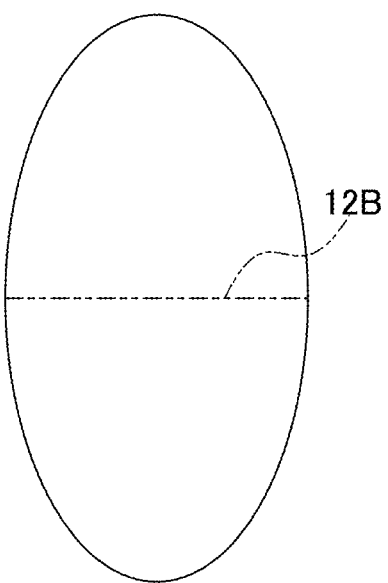
FIG. 7 is a top view showing a machining direction in a long-axis direction and a direction reversing part extending in a short-axis direction when a cut oval sphere is viewed from above.

A machining shape to generate direction reversal is not limited to a cut sphere and may be a different shape. For example, a cut oval sphere is applicable cut spherical body includes a cut oval sphere in addition to a cut sphere. Even it the machining shape is a cut oval sphere, the direction reversing part is still aligned in a straight line when viewed from above. Meanwhile, the length of the direction reversing part changes in a manner that depends on whether a machining direction is in a short-axis direction or a long-axis direction. The short-axis direction and the long-axis direction mentioned herein mean a direction parallel to the short axis of an oval and a direction parallel to the long axis of the oval when the cut oval sphere is viewed from above. An intersection between the short axis and the long axis of the oval corresponds to the center of the oval. As shown in FIG. 6, if the machining direction is in the short-axis direction when the cut oval sphere is viewed from above, a direction reversing part 12A is formed to extend in the long-axis direction. As shown in FIG. 7, if the machining direction is in the long-axis direction, a direction reversing part 12B is formed to extend in the short-axis direction. In FIGS. 2 and 3, a machining shape to generate the direction reversing part 12 has a projecting shape. Meanwhile, even a recessed shape still generates a direction reversing part, so that a machining shape to generate the direction reversing part may be a recessed shape. However, regarding measurement of the width of a stripe using a contact measuring machine, a recessed shape is more difficult to measure than a projecting shape. Thus, a projecting shape is more preferable as a machining shape to generate the direction reversing part 12.

Figure 8:
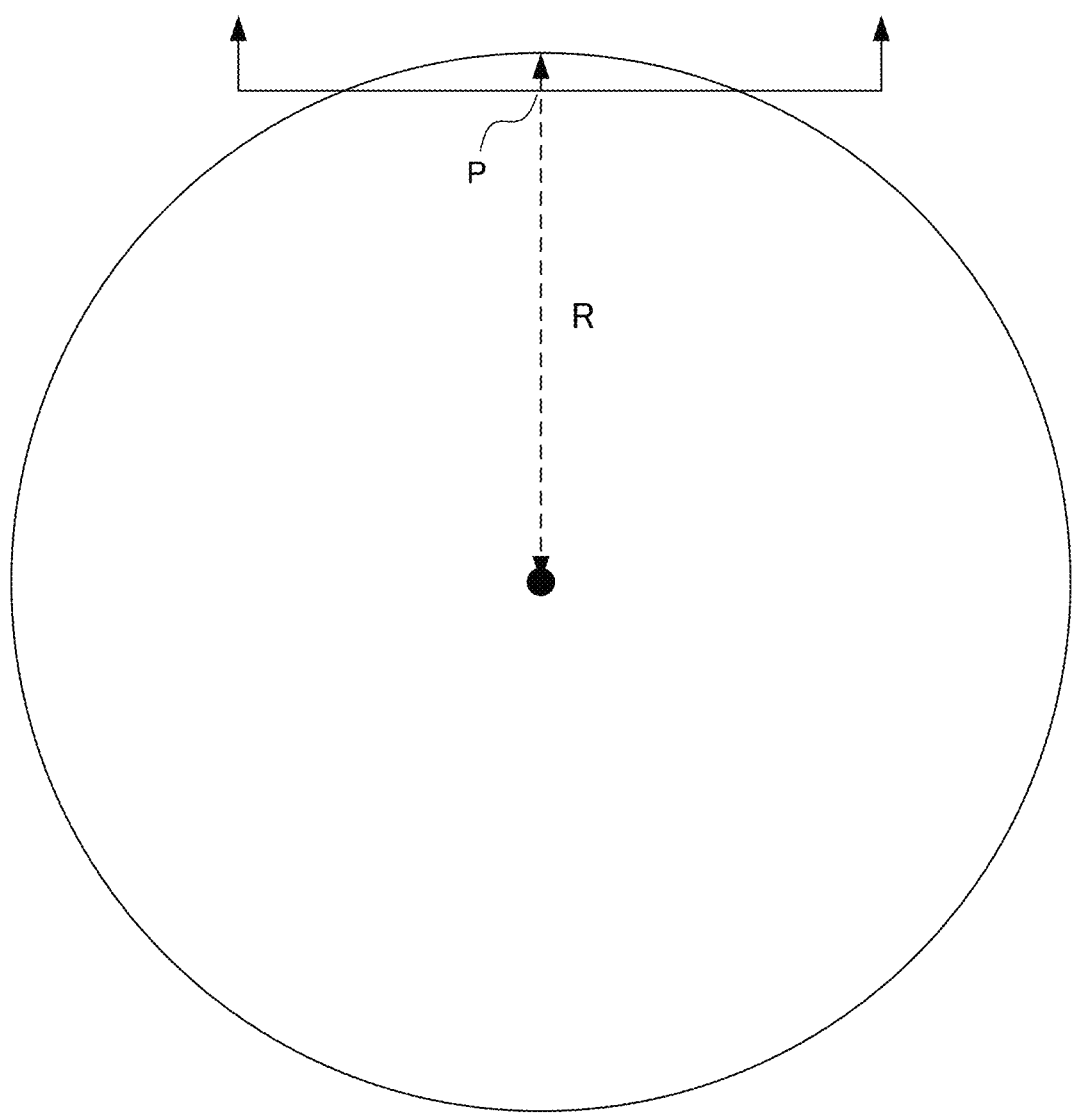
FIG. 8 is an explanatory view explaining the shape of a cut sphere.

The properness of the backlash compensation by the servo controller is evaluated based on the occurrence of a stripe at the direction reversing part 12. Further, the superiority or inferiority of a mechanical structure (accuracy of positioning, by the ball screw, for example) or that of the function of the servo controller (whether the backlash compensation has been made by giving consideration to the elastic deformation of the ball screw itself, for example) can be evaluated used on whether a stripe becomes erasable at the direction reversing part by the backlash compensation performed by the servo controller. As shown in FIG. 8, the cut sphere of the evaluation work piece 10 has a shape determined by cutting a sphere having a radius R of 80 mm at a flat surface at a position P separated from the center of the sphere by 76.6 mm. However, these are not the only numerical values for the radius R for defining the shape of the cut sphere and the location of the position P for determining the cut position. The radius R and the location of the position P may be determined freely, as long as a condition for making the foregoing evaluation expressly is satisfied.

<Corner Part 13>

If the setting of acceleration/deceleration of the feed axis is improper so speed is not reduced sufficiently at a part where a direction of movement of the tool is to change rapidly such as a corner part, and if servo setting is improper so the followability of the servo motor is low, for example, an inward turning occurs in a tool path relative to a shape in a command deviated from a commanded tool path. For example, if inward turnings occurring between tool paths for reciprocating machining of a mold, etc. adjacent in the Y-axis direction are aligned regularly at a corner part where a direction of movement of the tool changes from the X-axis direction to the Z-axis direction, the corner extending in the Y-axis direction is rounded and this rounded corner is recognizable by the naked eye.

The evaluation work piece 10 of this embodiment includes the corner part 13 having a projecting shape. By the presence of the corner part 13 having a projecting shape, a part to generate rapid change in a movement direction is ensured. On the occurrence of inward turnings in tool paths, the inward turnings are aligned regularly at the projecting corner part to generate the rounded corner. The shape of a recessed part for forming the corner part 13 is not particularly limited, as long as it can be used for forming a corner part. The cross-sectional shape of the recessed part may be a cut oval shape, a semicircular shape, or an inverted trapezoidal shape, for example. In FIGS. 2 and 3, a recessed part 19 for forming the corner part 13 has a cut oval shape. The corner part 13 may have any of an acute angle, a right angle, and an obtuse angle.

The properness of the setting of acceleration/deceleration made by the numerical controller and the properness of the setting of the followability of the servo motor made by the servo controller can be evaluated based on the occurrence of roundness at the corner part 13. Further, the superiority or inferiority of a mechanical structure (low servo accuracy, for example) and that of the function of the numerical controller (not having a function for alleviating an inward turning, for example) can be evaluated based on whether roundness at the corner part 13 becomes erasable by the settings made by the numerical controller and the servo controller.

<Flat Surface Part 14>

The surface roughness of the machining surface is influenced by a machine condition such as rigidity or spindle vibration, a tool condition such as the shape of a tool nose or a cutting edge, and a machining condition such as one stroke or a cutting tool to reduce an evaluated value of the surface roughness of the machining surface such as surface roughness Ra.

The evaluation work piece 10 of this embodiment includes the triangular flat surface part 14. By the presence of the flat surface part 14, a part not to be influenced by the functions of the numerical controller and the servo controller and settings made by the numerical controller and the servo controller is ensured. The presence of a problem in the mechanical condition, the tool condition, and the machining condition can be evaluated in terms of the surface roughness Ra, for example. The surface roughness Ra is called arithmetic mean roughness or center line mean roughness, and shows a value determined by drawing a center line at a roughness curve and dividing the area of concavo-convex by the length. The flat surface part 14 is only required to be a flat surface without causing concavo-convex at the machining surface and is capable of being machined without being influenced by the functions of the numerical controller and the servo controller and settings made by the numerical controller and the servo controller. The flat surface part 14 is not required to be triangular and may be rectangular, for example. The flat surface part 14 is not required to be a horizontal surface and may be a tilted surface. The triangle mentioned herein has side lengths of 25 mm, 35 mm, and 43 mm. However, these are not the only numerical values of the lengths of the sides of the triangle and any value on a flat surface is applicable.

<Boundary Part 15 Between a Flat Surface and Free-Form Surface>

At a boundary part between a flat surface and a free-form surface with a changing curvature, the curvature of the free-form surface changes between adjacent tool paths in the case of machining of a mold by a reciprocating motion of the tool, etc. to cause a slight reciprocating path level difference within an allowable range (tolerance). Improper setting of a time constant of acceleration/deceleration after interpolation increases the reciprocating path level difference due to path error to cause a stripe in a machining direction and this stripe is recognizable the naked eye.

The evaluation work piece 10 of this embodiment includes the boundary part 15 between a flat surface and free-form surface. The boundary part mentioned herein means a part including areas in front of and behind a boundary between the flat surface and the free-form surface with a changing curvature. By the presence of the boundary part 15 arranged at the evaluation work piece 10 including the flat surface and the free-form surface with a changing curvature, a slight reciprocating path level difference is ensured. It the setting of a time constant of acceleration/deceleration after interpolation is not made properly, the reciprocating path level difference is increased to cause a stripe in a machining direction.

Figure 9:
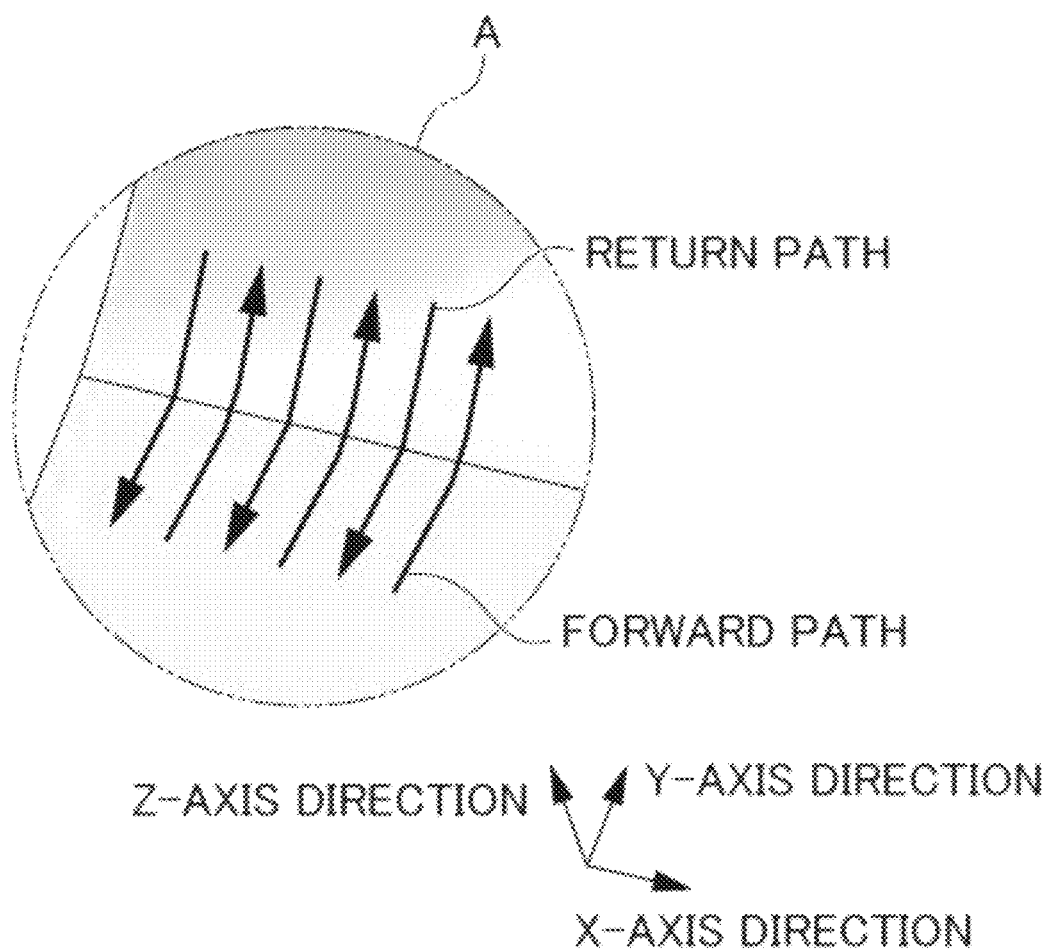
FIG. 9 is a partially enlarged view of area A in FIG. 2 explaining machining at a boundary part 15 between a flat surface and a curved surface of the evaluation work piece this embodiment.
Figure 10:
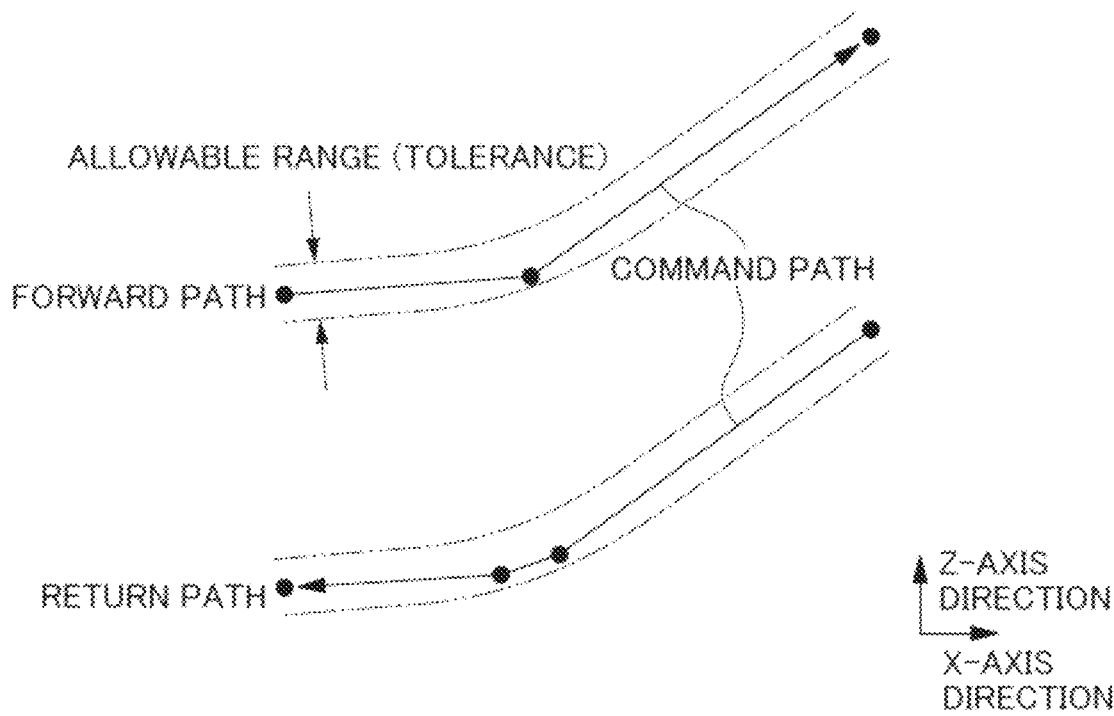
FIG. 10 is an explanatory view showing a forward path and a return path in a command path within an allowable range (tolerance)
Figure 11:
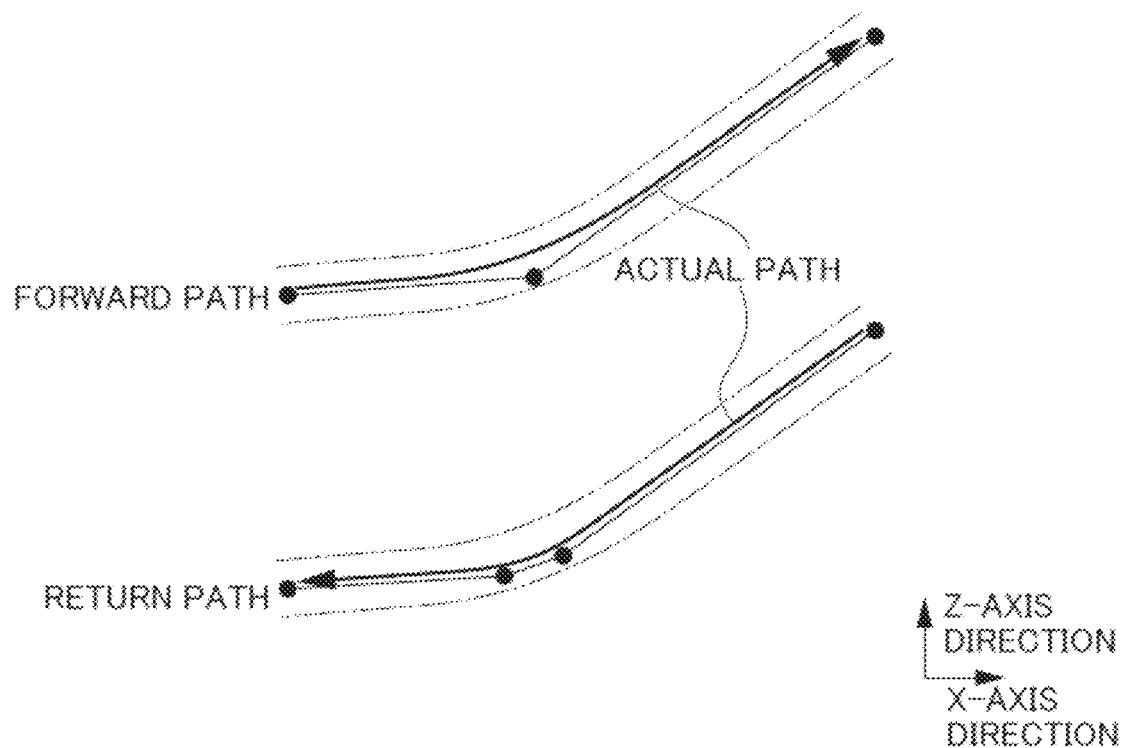
FIG. 11 an explanatory view showing a forward path and a return path in an actual path within the allowable range (tolerance)

The following describes a reason why arrangement of the boundary part 15 generates a reciprocating path level difference to cause a stripe in the machining direction. FIG. 9 is a partially enlarged view of area A in FIG. 2 explaining machining at the boundary part 15 between the flat surface and the free-form surface of the evaluation work piece of this embodiment. FIG. 10 is an explanatory view showing a forward path and a return path in a command path within an allowable range (tolerance). FIG. 11 is an explanatory view showing a forward path and a return path in an actual path within the allowable range (tolerance). As shown in FIG. 9, a path of machining by the tool includes a forward path extending from the flat surface to the free-form surface and a return path extending backward from the free-form surface to the flat surface. The forward path and the return path in the command path within the allowable range are shown in FIG. 10. The command path differs between the forward path and the return path and a reciprocating path level difference is caused between the forward path and the return path. If the setting of a time constant of acceleration/deceleration after interpolation made by the numerical controller is improper, the reciprocating path level difference between the forward path and the return path in the actual path is increased within the allowable range (tolerance) as shown in FIG. 11 compared to the path level difference in the command path shown in FIG. 10, causing a stripe in the machining direction.

As shown in FIG. 9, the flat surface of the evaluation work piece 10 is a horizontal surface. The free-form surface includes a curved surface (ruled surface) in which a curvature changes continuously defined by two straight lines, a first straight line connecting a point (50.000, −5.000, 1.353) and a point (45.000, −5.000, 0.953), and a second straight line connecting a point (45.000, 0, 0) and a point (50.000, 0, 0). The free-form surface is not United to these numerical values and any value to make the foregoing stripe apparent is applicable.

The properness of the setting of a time constant of acceleration/deceleration after interpolation made by the numerical controller can be evaluated based on the occurrence of a stripe at the boundary part between the flat surface and the free-form surface. If erasing the stripe is not permitted by the setting by the numerical controller, the superiority or inferiority of the function of the numerical controller (not having a function for alleviating an inward turning, for example) can be evaluated.

<Curved Surface Part 16>

To generate a machining program by computer-aided manufacturing (CAM) based on a shape defined by a free-form surface, the shape is linearly approximated within an allowable range (tolerance). Thus, if the allowable range (tolerance) is too large, a reciprocating path level difference occurs between adjacent tool paths on a free-form surface with a changing curvature in the case of machining of a mold by a reciprocating motion of the tool, for example. The reciprocating path level difference causes a stripe in a machining direction and this stripe is recognizable by the naked eye. The evaluation work piece 10 of this embodiment includes the curved surface part 16 having a free-form surface with a changing curvature. At the curved surface part 16 having a free-form surface with a changing curvature, a large allowable range (tolerance) causes a reciprocating path level difference and this reciprocating path level difference causes a stripe in a machining direction.

Figure 12:
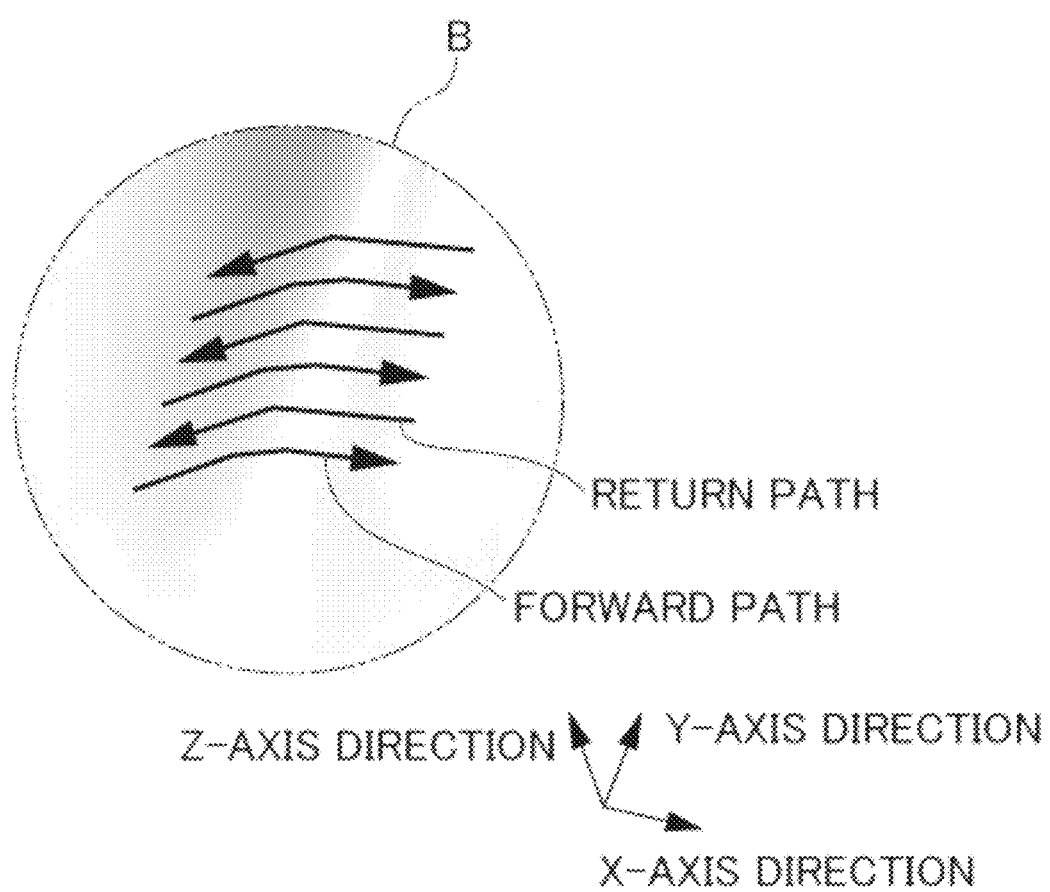
FIG. 12 is a partially enlarged view of area B in FIG. 2 explaining machining at a curved surface part 16 of the evaluation work piece this embodiment having a free-form surface with a changing curvature.
Figure 13:
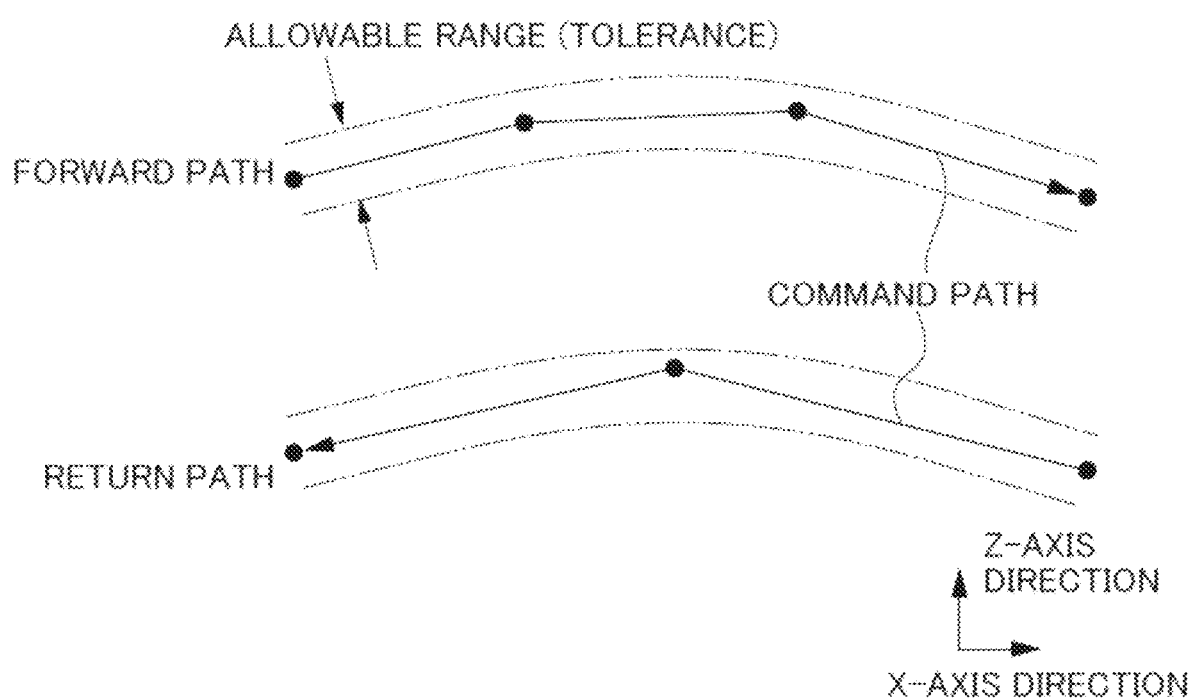
FIG. 13 is an explanatory view showing a forward path and a return path in a command path within an allowable range (tolerance)

FIG. 12 is a partially enlarged view of area B in FIG. 2 explaining machining at the curved surface part 16 of the evaluation work piece of this embodiment having a free-form surface with a changing curvature. FIG. 13 is an explanatory view showing a forward path and a return path in a command path within an allowable range (tolerance). As shown in FIG. 12, when the tool passes through the free-form surface with a changing curvature along a path of machining by the tool, an increased allowable range (tolerance) generates a command path difference between a forward path and a return path to cause a reciprocating path level difference between the forward path and the return path, as shown in FIG. 13. More specifically, as shown in FIG. 12, if the tool moves from an area having a large curvature to an area having a small curvature along the forward path and then the tool moves from the area having the small curvature to the area having the large curvature along the return path, a command path for the forward path includes a longer straight line resulting from linear approximation than a command path for the return path, thereby causing the reciprocating path level difference. The free-form surface of the evaluation work piece 10 includes a curved surface (ruled surface) in which a curvature changes continuously defined by two straight lines, a first straight line connecting a point (−2.000, −41.000, 0.133) and a point (−7.000, −41.000, 1.287), and a second straight line connecting a point (−7.000, −36.000, 0.904) and a point (−2.000, −36.000, 0.068). However, the free-form surface is not limited to these numerical values and any value to make the foregoing stripe apparent is applicable.

The properness of the setting of an allowable range of a machining program can be evaluated based on the occurrence of a stripe resulting from a reciprocating path level difference at the curved surface part having the free-form surface with a changing curvature. The superiority or inferiority of the setting of the allowable range of the machining program can also be evaluated.

<Curved Surface Part 17>

To generate a machining program by CAM based on a shape defined by a curved surface, the shape is linearly approximated within an allowable range (tolerance). If the allowable range (tolerance) is too large, the length of a straight line is increased to approximate the curved surface to a shape more similar to a polyhedron. If command points are aligned regularly between adjacent tool paths for reciprocating machining of a mold, for example, the polyhedron is recognizable by the naked eye.

Figure 14:
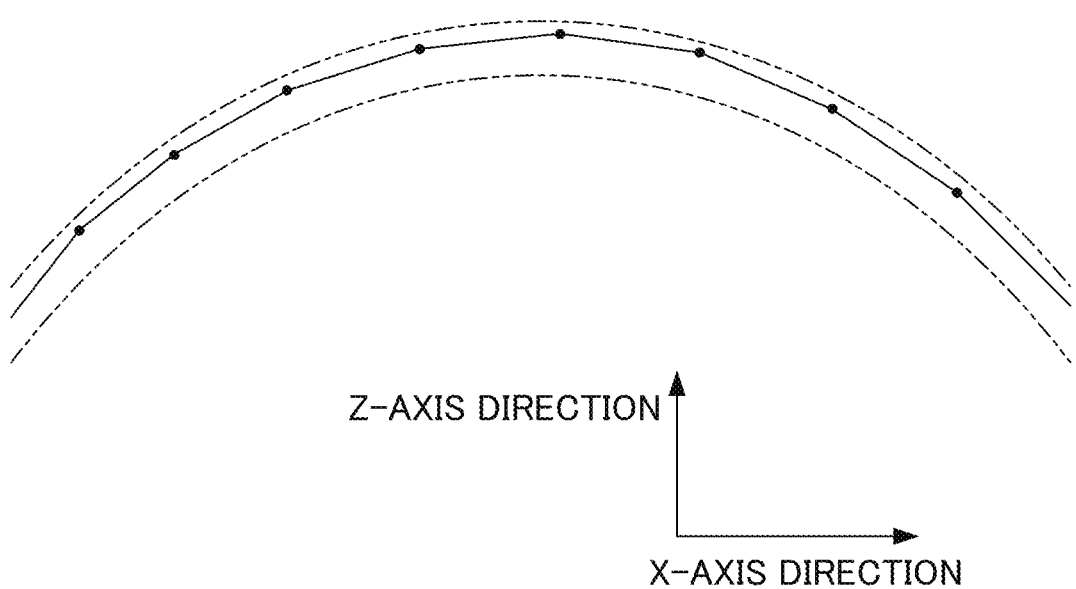
FIG. 14 is an explanatory view showing a path in a command path in the X-axis direction within an allowable range (tolerance)

The curved surface part 17 of the evaluation work piece 10 of this embodiment is a curved surface of a cut sphere part to form the direction reversing part 12. In this embodiment, the cut sphere part forming the direction reversing part 12 is also used as the curved surface part 17. By doing so, if a stripe appears at the direction reversing part, command points between adjacent tool paths are aligned regularly on the spherical surface, and an allowable range (tolerance) is large, a polyhedron pattern appears. As shown in FIG. 14, for example, if machining by the machine tool proceeds in response to a reciprocating motion of the tool along a tool path resulting from linear approximation the cut sphere part in the X axis direction and a reciprocating motion of the tool along a tool path adjacent in the Y-axis direction resulting from the same linear approximation, a polyhedron pattern having a rectangular shape on each surface appears. The shape of the curved surface part 17 is not particularly limited to the projecting shape of the cut sphere and a different projecting shape is applicable. In the presence of concavo-convex at the curved surface part 17, if a stripe is caused at the direction reversing part and if the curved surface part 17 has a changing curvature, a polyhedron pattern appears within an allowable range of a machining program. The curved surface part 17 at which a polyhedron pattern is to appear may be provided separately from the cut sphere part at which a stripe at the direction reversing part is to appear and may be provided as a part having a different shape from this cut sphere part. While the curved surface part 17 is described as having a projecting shape, the curved surface part 17 may have a recessed shape. A polyhedron pattern and a stripe at the direction reversing part can also appear at the recessed shape.

While the seven evaluation parts including the vertical level difference part 11, the direction reversing part 12, the corner part 13, the flat surface part 14, the boundary part 15 between a flat surface and a curved surface, the curved surface part 16, and the curved surface part 17 have been described above, arrangement of these evaluation parts at the evaluation work piece 10 will be described next. The seven evaluation parts can be evaluated using a contact surface roughness measuring machine, a projector, and a three-dimensional measuring machine, for example. If the contact surface roughness measuring machine, the projector, and the three-dimensional measuring machine are used, there are preferable arrangements for the evaluation parts, which will be described below.

<Arrangement of Flat Surface Part 14>

Figure 15:
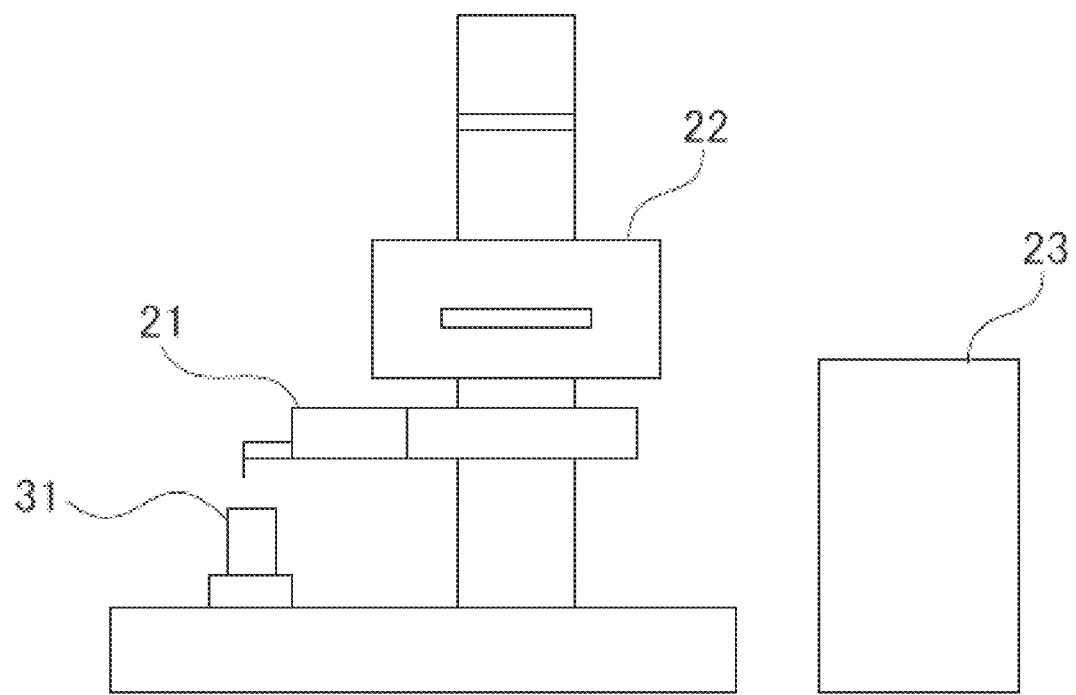
FIG. 15 is an explanatory view showing the entire configuration of a contact surface roughness measuring machine.
Figure 16:
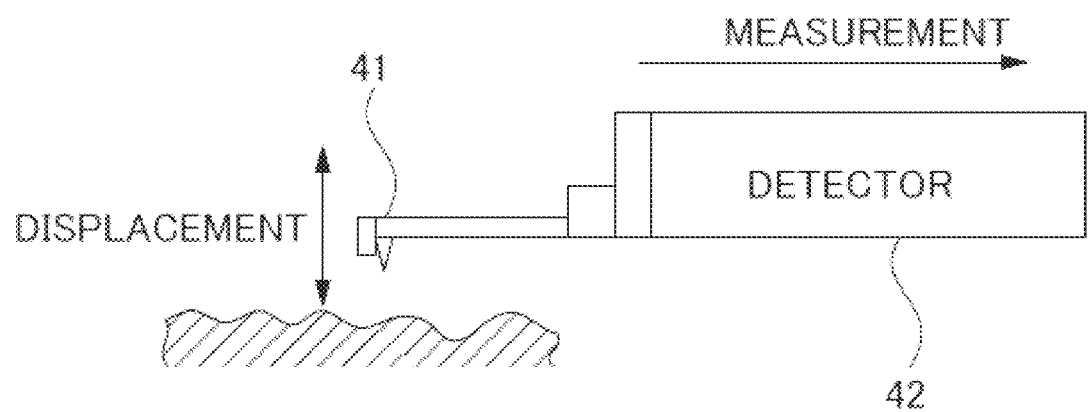
FIG. 16 is an explanatory view showing the configuration of a detection unit of the contact surface roughness measuring machine.
Figure 17:
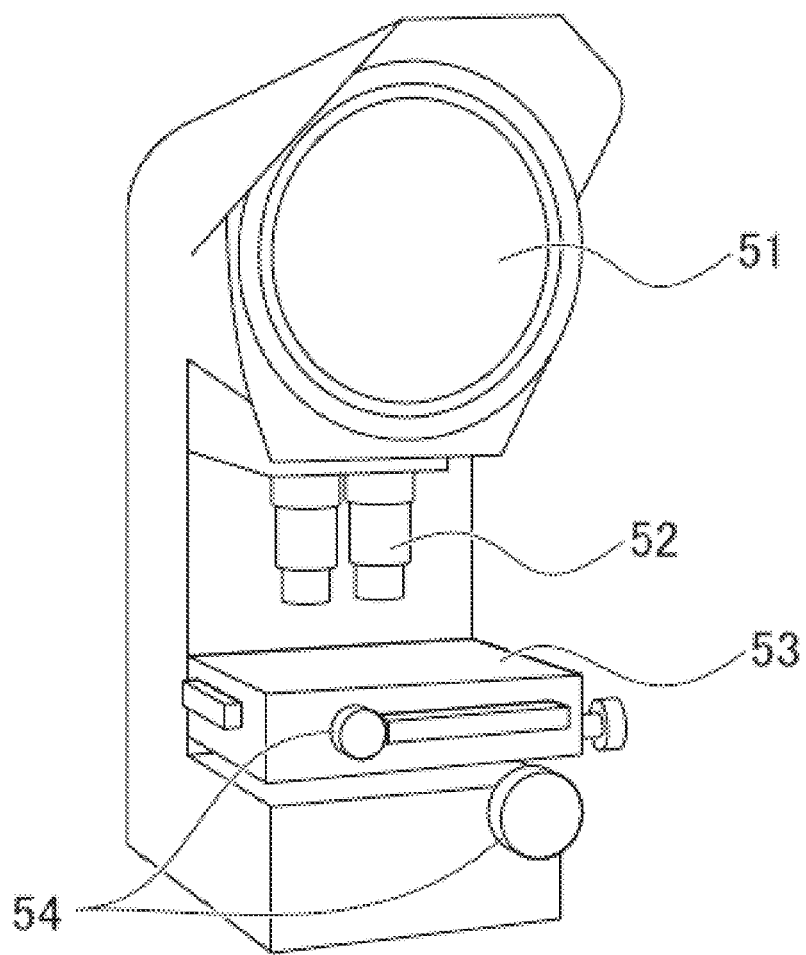
FIG. 17 is an explanatory view showing the entire configuration of a projector.

As shown in FIG. 15, the contact surface roughness measuring machine measures the surface roughness of a measurement target 31 using a detection unit 21 driven by a driving unit 22. As shown in FIG. 16, the detection unit 21 includes a sensing pin 41 and a detector 42. With the sensing pin 41 contacting the measurement target 31, surface roughness is measured with the sensing pin 41 being pulled in the horizontal direction by the driving unit 22. The detector 42 detects vertical motion of the sensing pin 41 and a calculation unit 23 calculates surface roughness. For measurement of an evaluation part of the evaluation work piece 10 by the contact surface roughness measuring machine, failing to arrange a measurement surface to be contacted by the sensing pin 41 along the exterior of the evaluation work piece 10 may make a different evaluation part interfere with the sensing pin. The surface roughness Ra of the flat surface part 14 is to be measured by the contact surface roughness measuring machine. Thus, the flat surface part 14 is desirably arranged on the exterior of the evaluation work piece 10.

<Arrangement of Corner Part 13>

As shown in FIG. 11, the projector is configured in such a manner that a target is placed on a movable stage 53 and light is applied to the target from below, thereby projecting the contour of the target on a projection screen 51 through a projection lens 52. The movable stage 53 moved with stage moving handle 54. Thus, a shielding object other than the target is required to be excluded from a projection route of light projected to the target and reaching the projection lens 52. For measurement of the roundness of the corner part 13 using the projector, the roundness of the corner part 13 is measured while the evaluation work piece 10 is placed in an upright position on the movable stage 53. In this case, a shielding object other than the corner part 13 is required to be excluded from the projection route of light projected to the corner part 13 and reaching the projection lens 52. In consideration of arrangement of a different evaluation part other than the corner part 13, the corner part 13 is desirably arranged at a corner of the evaluation work piece 10 in order to increase a degree of freedom of arrangement of the different evaluation part higher than the corner part 13 and likely to become a shielding object. Meanwhile, in the absence of a different evaluation part at the evaluation work piece higher than the corner part 13 and likely to become a shielding object or in the absence of a shielding object higher than the corner part 13 on the projection route, the corner part 13 is not always required to be arranged at a corner of the evaluation work piece 10.

<Arrangement of Direction Reversing Part 12 and Curved Surface Part 17>

The three-dimensional measuring machine sets a reference surface and makes point measurement or line measurement to detect three-dimensional coordinate values based on the reference surface. Measurement error is increased if a measured part is at a greater distance from the reference surface. Thus, for measurement of a surface of the entire evaluation work piece, the reference surface desirably has such a ring-like shape as to make a match between the center of the evaluation work piece and the center of the reference surface. By the provision of this ring-like reference surface, an increase in measurement error occurring in measurement by the three-dimensional measuring machine can be prevented at any part. The ring-like shape is not limited to a shape of a circular ring and can be a different shape such as a rectangular ring, for example. As shown in FIGS. 2 and 3, this embodiment, the reference surface of the three-dimensional measuring machine is a reference surface 18 having a circular ring-like shape. As shown in FIGS. 2 and 3, if the reference surface of the three-dimensional measuring machine is formed into a circular ring-like shape having a center matching the center of the evaluation work piece, the direction reversing part 12 and the curved surface part 17 are desirably arranged inside the circular ring so as to form each of the direction reversing part 12 and the curved surface part 17 into a cut sphere and to arrange the circular ring of the reference surface 18 around a circle at a cutting surface of the cut sphere. Providing the direction reversing part 12 and the curved surface part 17 in this way allows the three-dimensional measuring machine to measure the direction reversing part and the curved, surface part 17 in a manner that prevents an increase in measurement error without the need to provide a needless area for arrangement of the reference surface at the evaluation work piece.

<Modifications>

In the foregoing embodiment, the seven evaluation parts are formed at one evaluation work piece. However, any single one of the seven evaluation parts may be formed at one evaluation work piece. Alternatively, two or more of the seven evaluation parts may be combined and evaluation parts numbering from two to six may be formed at one evaluation work piece. Priority is given to evaluations in the following descending order: a striped pattern at the vertical level difference part 11, a stripe at the direction reversing part 12, the roundness of the corner part 13, the surface roughness of the flat surface part 14, a stripe at the boundary part 15 between a flat surface and a curved surface, a stripe at the curved surface part 16, and a polyhedron pattern at the curved surface part 17. Thus, if evaluation parts numbering from two to six are to be formed at one evaluation work piece, two or more evaluation items may be selected by following this order and corresponding evaluation parts may be formed at one evaluation work piece.

If evaluation parts numbering from two to six are to be formed at one evaluation work piece, the following evaluation items relating to the function of the numerical controller such as setting of an acceleration may be selected: a striped pattern at the vertical level difference part 11, the roundness of the corner part 13, and a stripe at the boundary part 15 between a flat surface and a curved surface. Then, corresponding evaluation parts nay be formed at one evaluation work piece. Alternatively, the following evaluation items relating to the function of the servo controller such as backlash compensation and the followability of the servo motor may be selected: a stripe at the direction reversing part 12 and the roundness of the corner part 13. Then, corresponding evaluation parts may be formed at one evaluation work piece. Still alternatively, the following evaluation items relating to setting of an allowable range of a machining program, etc. may be selected: a stripe at the curved surface part 16 and a polyhedron pattern at the curved surface part 17. Then, corresponding evaluation parts may be formed at one evaluation work piece.

This embodiment is not limited to the foregoing combinations of the evaluation items. Evaluation items as focuses of attention may be selected appropriately and corresponding evaluation parts nay be formed at one evaluation work piece.

The following describes a CAD data structure and a machining program for use in a control system for a machine tool that produces the evaluation work piece described above.

<Machining Program>

The machining program is a program that causes a computer as a numerical controller that produces an evaluation work piece by driving a machine tool to perform at least one the following processes (a) to (g)

(a) As shown in FIG. 4, a process of decelerating a tool when the tool moves along a lower flat surface toward a vertical level difference, accelerating and decelerating the tool at the vertical level difference, and accelerating the tool when the tool moves along, an upper flat surface from the vertical level difference, and a process of decelerating the tool when the tool moves along the upper flat surface toward the vertical level difference, accelerating and decelerating the tool at the vertical level difference, and accelerating the tool when the tool moves along the lower flat surface from the vertical level difference;

(b) a process of reversing a direction of movement of the tool at the direction reversing part 12 in a height direction when the tool is used for machining of a three-dimensional object including a curved surface;

(c) a process of changing a direction of movement of the tool at the corner part 13;

(d) a process of moving the tool at the flat surface part 14;

(e) a process of reciprocating the tool at the boundary part 15 between a flat surface and a curved surface with a changing curvature;

(f) a process of reciprocating the tool at the curved surface part 16 having a curved surface with a changing curvature; and (g) a process of reciprocating the tool in such a manner that command points are aligned regularly between adjacent tool paths at the curved surface part 17.

<CAD Data Structure>

The amp data structure is a data structure for CAD data for use in a control system for a machine tool that produces an evaluation work piece by generating a machining program based on the amp data and driving the machine tool. The CAD data structure is a data structure for machining at least one of the following parts (A) to (G) of the evaluation work piece:

(A) the vertical level difference part 11 having a vertical level difference, and flat surfaces arranged on both sides of the vertical level difference;
(B) the direction reversing part 12 at which a direction of movement of a tool in a height direction is reversed when the tool is used for machining of a three-dimensional object including a curved surface;
(C) the corner part 13 at which a direction of movement the tool changes;
(D) the flat surface part 14;
(E) the boundary part 15 between a flat surface and a curved surface with a changing curvature;
(F) the curved surface part 16 having a curved surface with a changing curvature; and
(G) the curved surface part 17 at which command points are aligned regularly between adjacent tool paths on a curved surface.

<Storage Medium>

The foregoing machining program or CAD data structure can be stored using various types of non-transitory computer-readable media and can be supplied to a computer. The non-transitory computer-readable media include various types of tangible storage media. Examples of the non-transitory computer-readable storage media include a magnetic storage medium (hard disk drive, for example), a magneto-optical storage medium (magneto-optical disk, for example), a read-only memory (CD-ROM), a CD-R, a CD-R/W, and semiconductor memory (mask ROM, programmable ROM (PROM), erasable PROM (EPROM), flash ROM, and random access memory (RAM), for example).

Second Embodiment

The evaluation work piece of the first embodiment is formed by producing at least one of the vertical level difference part 11, the direction reversing part 12, the corner part 13, the flat surface part 14, the boundary part 15 between a flat surface and a curved surface, the curved surface part 16, and the curved surface part 17 at a substrate. Shape accuracy is evaluated by measuring the produced evaluation part using a contact surface roughness measuring machine, a projector, and a three-dimensional measuring machine, for example.

According to this embodiment, an evaluation work piece includes the following using the control system 60 for a machine tool: one or more of the seven evaluation parts (a part machined by a machine tool); and one or multiple inverted shape evaluation parts (to become an inverted shape part) having a concavo-convex shape inverted from a concavo-convex shape of the one or two or more evaluation parts. The evaluation part and the inverted shape evaluation part are arranged symmetrically about a reference line on a surface of a substrate. If a first evaluation work piece including one or multiple evaluation parts and one or multiple inverted shape evaluation parts is rotated a certain angle from a second evaluation work piece having the same shape as the first evaluation work piece, the evaluation part and the inverted shape evaluation part of the first evaluation work piece become capable of being fitted to the inverted shape evaluation part and the evaluation part of the second evaluation work piece respectively. Shape accuracy can be evaluated using the first evaluation work piece and the second evaluation work piece fitted to each other.

The configuration of the evaluation work piece of this embodiment will be described below. To facilitate understanding, an evaluation work piece used in the following description includes three evaluation parts having simpler configurations than those of the seven evaluation parts of the first embodiment, and three inverted shape evaluation parts having concavo-convex shapes inverted from the concavo-convex shapes of the respective corresponding evaluation parts.

Figure 18:
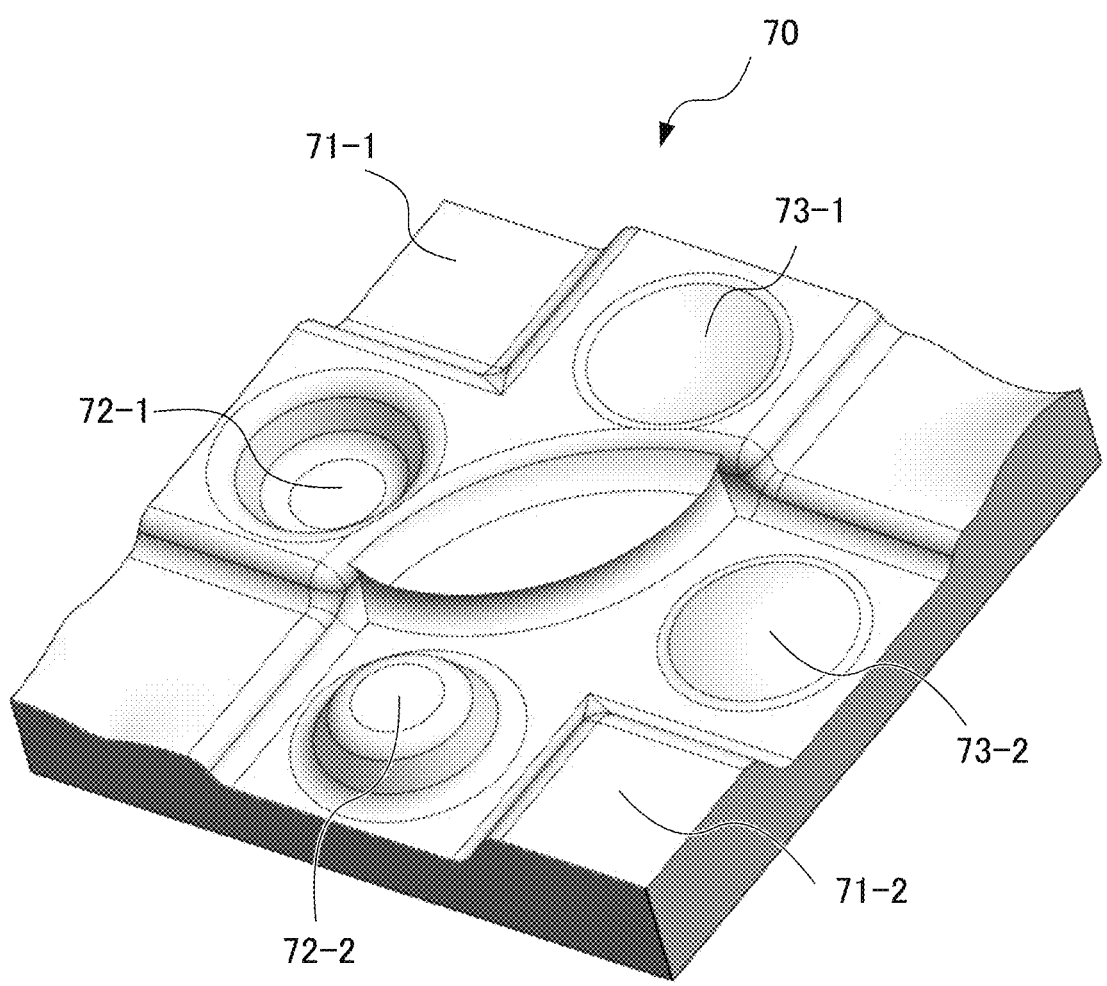
FIG. 18 is a perspective view showing an example of an evaluation work piece used for evaluating shape accuracy produced by fitting two evaluation work pieces to each other.
Figure 19:
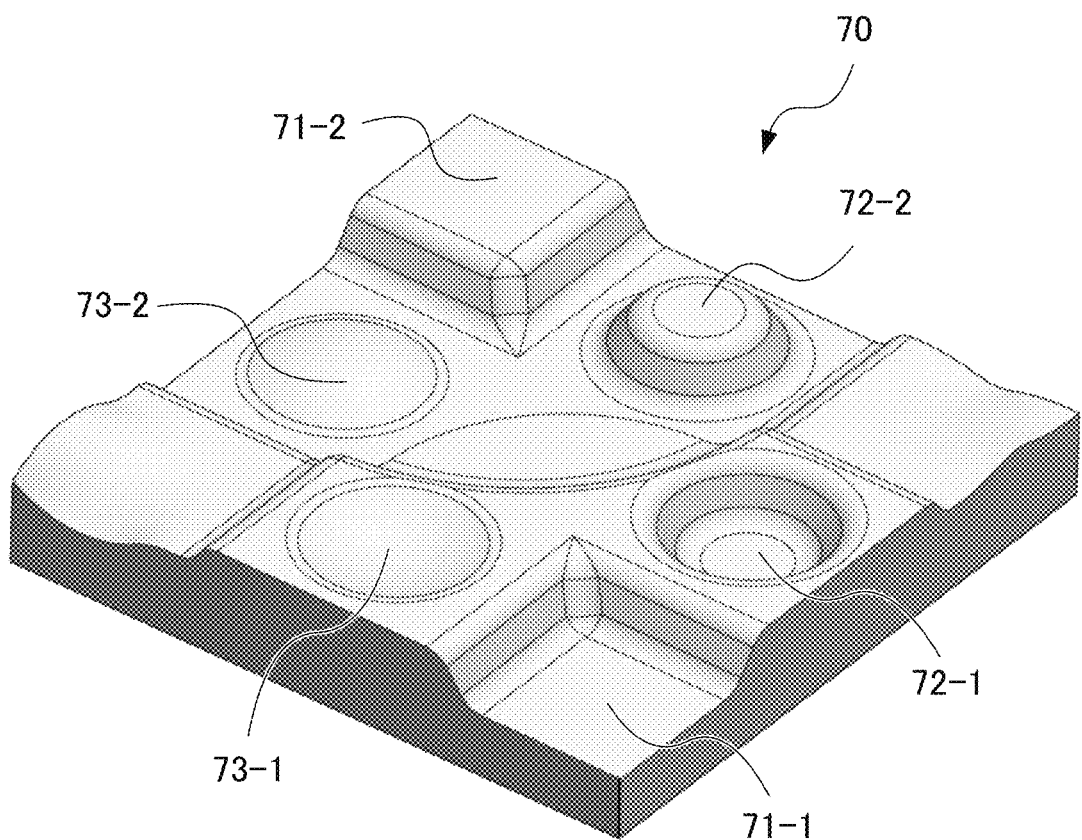
FIG. 19 is a perspective view showing the evaluation work piece in FIG. 18 taken from a direction opposite the direction of FIG. 18.
Figure 20:
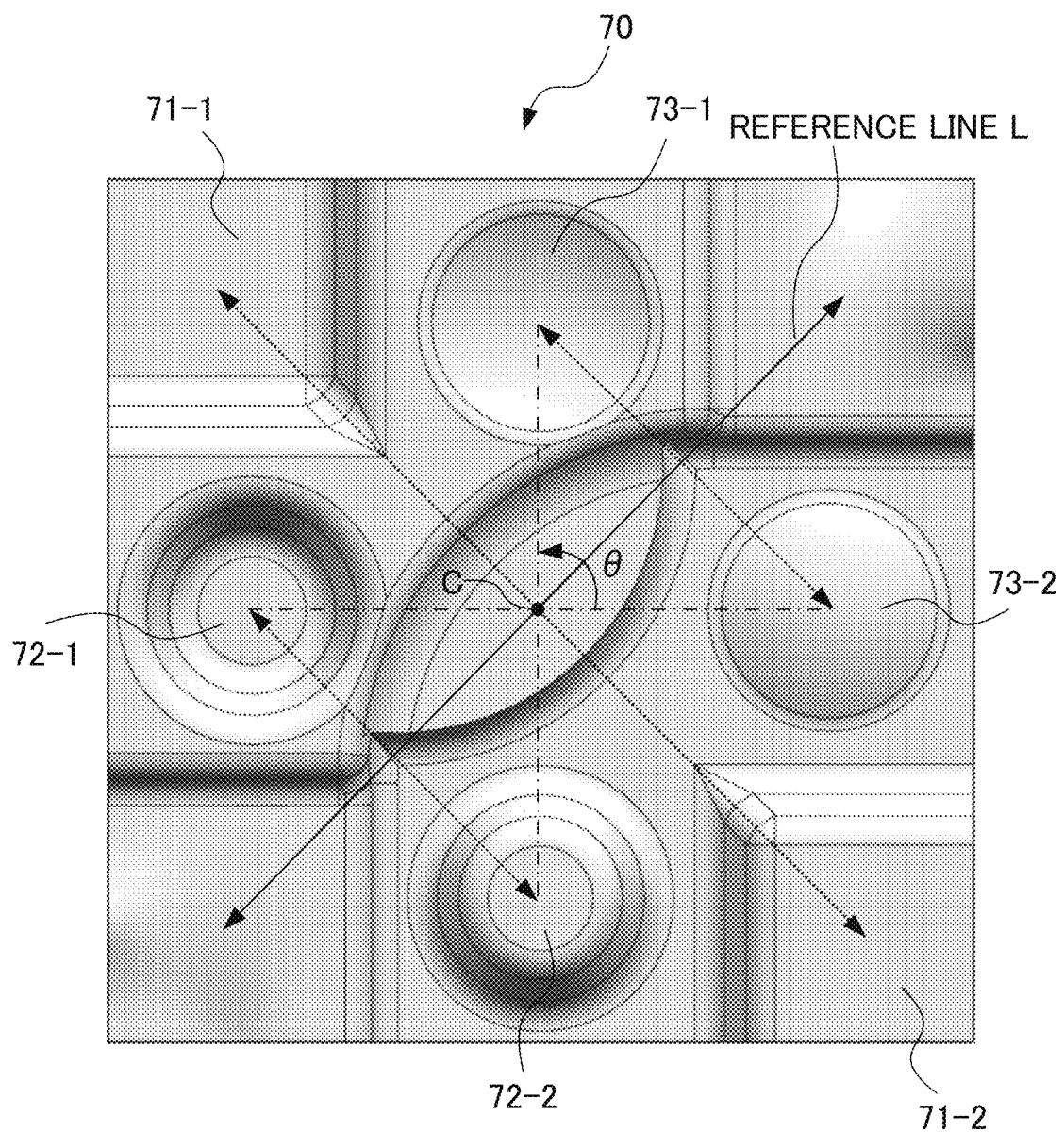
FIG. 20 is a plan view explaining arrangement of three evaluation parts and three inverted shape evaluation parts.

FIG. 18 is a perspective view showing an example of an evaluation work piece used for evaluating shape accuracy produced fitting two evaluation work pieces to each other. FIG. 19 is a perspective view showing the evaluation work piece in FIG. 18 taken from a direction opposite the direction of FIG. 18. FIG. 20 is a plan view explaining arrangement of the three evaluation parts and the three inverted shape evaluation parts. As shown in FIGS. 18 to 20, an evaluation work piece 70 having this exemplary configuration includes an evaluation part 71-1 with a rectangular groove, an inverted shape evaluation part 71-2 with a rectangular projection having an inverted shape from the evaluation part 71-1, an evaluation part 72-1 with a circular hole, an inverted shape evaluation part 72-2 with a circular projection having an inverted shape from the evaluation part 72-1, an evaluation part 73-1 with an arc-like recessed surface in cross section, and an inverted shape evaluation part 73-2 with an arc-like projecting surface in cross section having an inverted shape from the evaluation part 73-1. As shown in FIG. 20, the evaluation part 71-1 and the inverted shape evaluation part 71-2, the evaluation part 72-1 and the inverted shape evaluation part 72-2, and the evaluation part 73-1 and the inverted shape evaluation part 73-2 are arranged at symmetric positions about a reference line L on a surface of a substrate (indicated by dashed lines). While the evaluation work piece 70 is illustrated as having a square upper surface and the reference line L is illustrated as a diagonal, the reference line L is not limited to a diagonal and may be any line.

Figure 21:
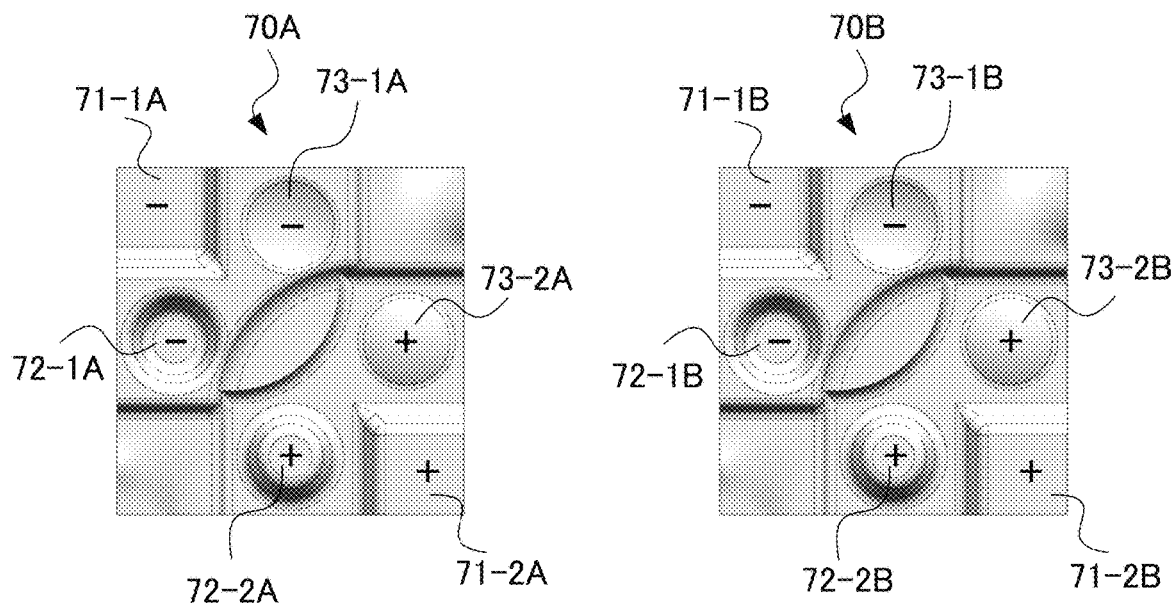
FIG. 21 shows two evaluation work pieces arranged side by side.
Figure 22:
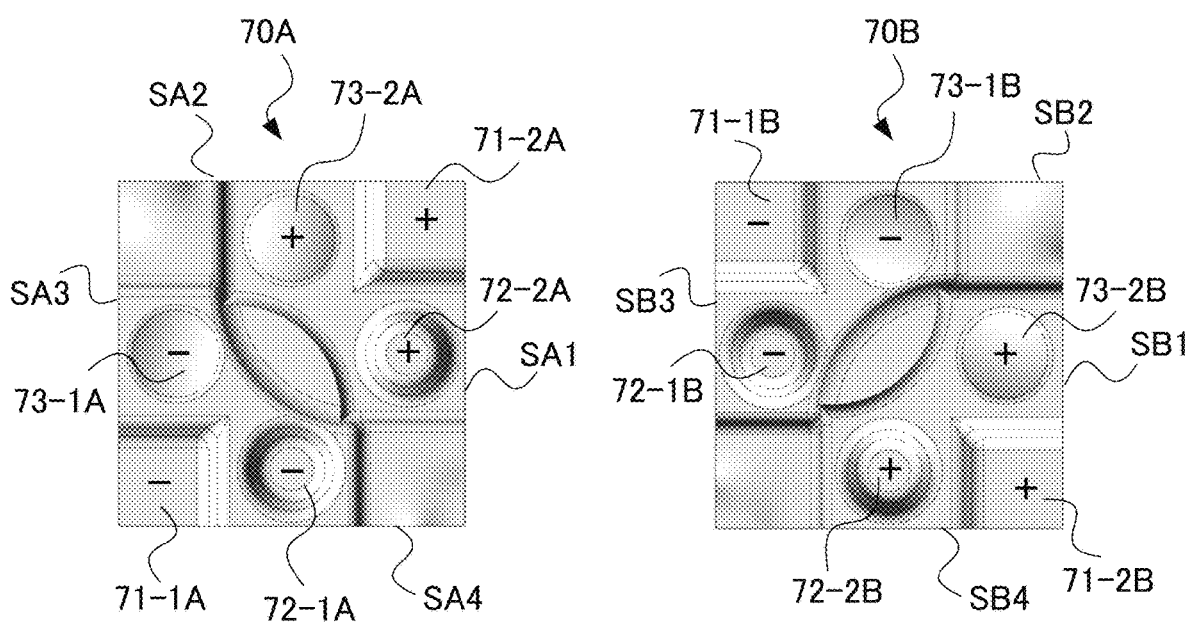
FIG. 22 shows two evaluation work pieces arranged side by side with one of the evaluation work pieces rotated 90 degrees in a direction opposite the clockwise direction.
Figure 23:
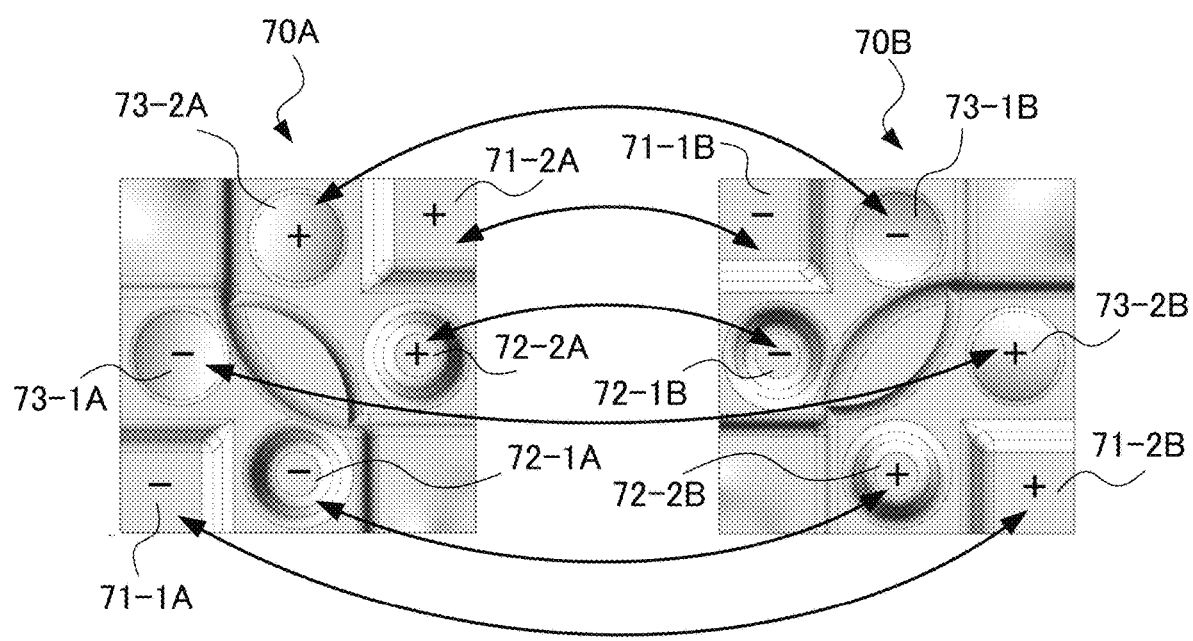
FIG. 23 shows positional relationships between evaluation parts and inverted shape evaluation parts of one of the evaluation work pieces and evaluation parts and inverted shape evaluation parts of the other evaluation work piece based on the arrangement of FIG. 22.

Two evaluation work pieces 70A and 70B having the same shape as the evaluation work piece 70 are produced using a machine tool. FIG. 21 shows the two evaluation work pieces 70A and 70B arranged side by side. FIG. 22 shows the two evaluation work pieces 70A and 70B arranged side by side with the evaluation work piece 70A rotated 90 degrees in a direction opposite the clockwise direction. FIG. 23 shows positional relationships between the evaluation parts and the inverted shape evaluation parts of the evaluation work piece 70A and the evaluation parts and the inverted shape evaluation parts of the evaluation work piece 70B based on the arrangement of FIG. 22. In FIGS. 21 to 23, evaluation parts having recessed shapes are given "−" and evaluation parts having projecting shapes are given "+."

An evaluation part 71-1A of the evaluation work piece 70A and an evaluation part 71-1B of the evaluation work piece 70B correspond to the evaluation part 71-1 of the evaluation work piece 70. An inverted shape evaluation part 71-2A of the evaluation work piece 70A and an inverted shape evaluation part 71-2B of the evaluation work piece 70B correspond to the inverted shape evaluation part 71-2 of the evaluation work piece 70. An evaluation part 72-1A of the evaluation work piece 70A and an evaluation part 72-1B of the evaluation work piece 70B correspond to the evaluation part 72-1 of the evaluation work piece 70. An inverted shape evaluation part 72-2A of the evaluation work piece 70A and an inverted shape evaluation part 72-2B the evaluation work piece 70B correspond to the inverted shape evaluation part 72-2 of the evaluation work piece 70. An evaluation part 73-1A of the evaluation work piece 70A and an evaluation part 73-1B of the evaluation work piece 70B correspond to the evaluation part 73-1 of the evaluation work piece 70. An inverted shape evaluation part 73-2A of the evaluation work piece 70A and an inverted shape evaluation part 73-2B of the evaluation work piece 70B correspond to the inverted shape evaluation part 73-2 of the evaluation work piece 70.

While the two evaluation work pieces 70A and 70B are arranged side by side as shown in FIG. 21, the evaluation work piece 70A is rotated 90 degrees from the evaluation work piece 70B in a direction opposite the clockwise direction and then the evaluation work pieces 70A and 70B are arranged side by side, as shown in FIG. 22. As shown in FIG. 23, the evaluation work pieces 70A and 70B of FIG. 22 can be understood as being arranged in such a manner that the evaluation part 71-1A, the inverted shape evaluation part 71-2A, the evaluation part 72-1A, the inverted shape evaluation part 72-2A, the evaluation part 73-1A, and the inverted shape evaluation part 73-2A of the evaluation work piece 70A can be fitted to the inverted shape evaluation part 71-2B, the evaluation part 71-1B, the inverted shape evaluation part 72-2B, the evaluation part 72-1B, the inverted shape evaluation part 73-2B, and the evaluation part 73-1B of the evaluation work piece 70B respectively.

The evaluation work piece 70A and the evaluation work piece 70B are fitted to each other in such a manner that the evaluation part of the evaluation work piece 70A and the inverted shape evaluation part of the evaluation work piece 70B correspond to each other, and that the inverted shape evaluation part of the evaluation work piece 70A and the evaluation part of the evaluation work piece 70B correspond to each other. As shown in FIG. 22, four sides SA1, SA2, SA3, and SA4 of the evaluation work piece 70A correspond to four sides SB1, SB2, SB3, and SB4 of the evaluation work piece 70B respectively. As a result of making a fit between the evaluation work piece 70A and the evaluation work piece 70B, the sides SA1 to SA4 of the evaluation work piece 70A face the sides SB3, SB2, SB1, and SB4 of the evaluation work piece 70B respectively. With the evaluation work piece 70A and the evaluation work piece 70B being fitted to each other, an observer is able to evaluate shape accuracy through a visual check by observing the position of a gap and an interval at the exterior. If the projection at the inverted shape evaluation part 72-2A) of the evaluation work piece 70A is larger than the hole at the evaluation part 72-1B of the evaluation work piece 70B, for example, a gap occurs between the side SA1 and the side SB3 to allow the observer to evaluate shape accuracy through a visual check.

The observer may apply a coating (red lead, for example) to one of the evaluation work piece 70A and the evaluation work piece 70B and observe the position or shape of the coating adhering to the other evaluation work piece. By doing so, the observer is able to evaluate shape accuracy through a visual check. If the projection at the inverted shape evaluation part 72-2A of the evaluation work piece 70A is smaller than the hole at the evaluation part 72-1B of the evaluation work piece 70B, for example, the coating applied to the periphery of the inverted shape evaluation part 72-2A adheres to the periphery of the evaluation part 72-1B. In this way, the observer is able to evaluate shape accuracy through a visual check. Conversely, if the projection at the inverted shape evaluation part 72-2A of the evaluation work piece 70A is larger than the hole at the evaluation part 72-1B of the evaluation work piece 70B, a portion of the periphery of the evaluation part 72-1B is not coated with the coating applied to the periphery of the inverted shape evaluation part 72-2A. In this way, the observer is able to evaluate shape accuracy through a visual check.

The arrangement of the evaluation parts and the inverted shape evaluation parts of the evaluation work piece 70 is not limited to the arrangement shown in FIGS. 18 to 20. Referring to FIG. 20, an angle θ between a line connecting the center of the evaluation part 73-1 and a center point C (dashed-dotted line in FIG. 20) and a line connecting the center of the inverted shape evaluation part 73-2 and the center point C (dashed-dotted line in FIG. 20) is 90 degrees, for example. However, the angle θ is not limited to 90 degrees. For example, the angle θ may be set at 45 degrees by moving the evaluation part 73-1 and the inverted shape evaluation part 73-2 closer to the reference line (diagonal) L. Also in this case, by rotating the evaluation work piece 70A 90 degrees in a direction opposite the clockwise direction from the evaluation work piece 70B as shown in FIG. 22, the evaluation part 73-1A becomes capable of being, fitted to the inverted shape evaluation part 73-2B and the inverted shape evaluation part 73-2A becomes capable of being titter to the evaluation part 73-1B. While the reference line L is illustrated as a diagonal and passes through the center point C in FIG. 22, the reference line L may not pass through the center point C.

The foregoing, description becomes applicable to the evaluation work piece 10 of the first embodiment by replacing one or multiple pairs each including one of the three evaluation parts and one of the three inverted shape evaluation parts of the evaluation work piece 70 having concavo-convex shapes inverted from each other by one or multiple pairs each including one of the seven evaluation parts and one of the seven inverted shape evaluation parts of the evaluation work piece 10 having concavo-convex shapes inverted from each other. For example, the corner part 13 shown in FIG. 2 may be arranged instead of the inverted shape evaluation part 71-2 of the evaluation work piece 70, and an inverted shape part having a shape inverted from the shape of the corner part 13 may be arranged instead of the evaluation part 71-1. Further, the vertical level difference part 11 shown in FIG. 2 may be arranged instead of the evaluation part 72-1 of the evaluation work piece 70, and an inverted shape part having a shape inverted from the shape of the vertical level difference part 11 may be arranged instead of the inverted shape evaluation part 72-2. Also, the curved surface part 16 shown in FIG. 2 may be arranged instead of the inverted shape evaluation part 73-2 of the evaluation work piece 70, and an inverted shape part having a shape inverted from the shape of the curved surface part 16 may be arranged instead of the evaluation part 73-1. By providing the corner part 13, the vertical level difference part 11 and the curved surface part 16, and three inverted shape parts having shapes inverted from the shapes of the corner part 13, the vertical level difference part 11, and the curved surface part 16 in this way, an observer is able to evaluate shape accuracy through a visual check.

<Effect of Second Embodiment>

In this embodiment, two evaluation work pieces are fitted to each other and an observer evaluates shape accuracy through a visual check without using a contact surface roughness measuring machine, a projector, a three-dimensional measuring machine, etc. By doing so, as in the first embodiment, influence by various factors such as a machining program, a numerical controller, a servo controller, a tool, and a machining condition on machining by a machine tool can be evaluated. A machine tool manufacturer can evaluate performance under a normal machining condition recommended for a machine tool at the time of shipment. For example, the machine tool manufacturer prepares a high accuracy evaluation work piece as a master by reducing a cutting speed. Then, the machine tool manufacturer produces a test evaluation work piece using the machine tool before shipment by following the same machining program as the master evaluation work piece and under a machining condition defining a normal cutting speed, for example. Then, the machine tool manufacturer fits the produced evaluation work piece to the master evaluation work piece. This allows the evaluation of performance under the normal machining condition recommended for the machine tool at the time of shipment. The machining program, the storage medium storing the machining program, and the CAD data structure described in the first embodiment are further applicable to this embodiment, except for the fact that the machining program and the CAD data structure are configured so as to arrange the evaluation part and the inverted shape evaluation part symmetrically about a reference line on a surface of a substrate.

While the foregoing embodiments are preferred embodiments of the present invention, the scope of the present invention is not limited only to the foregoing embodiments. Various modified embodiments of the present invention are applicable within a range not deviating from the substance of the present invention.

EXPLANATION OF REFERENCE NUMERALS 10, 70 Evaluation work piece
11 Vertical level difference part
12 Direction reversing part
13 Corner part
14 Flat surface part
15 Boundary part between flat surface and curved surface
16 Curved surface part
17 Curved surface part

What is claimed is:

1. An evaluation work piece for evaluating the influence of at least one factor of a machining program, a numerical controller, a servo controller, a tool, and machining conditions, on machining by a machine tool,
   the evaluation work piece comprising at least one of a part (B) or a part (G), and at least one of a part (A), a part (C), a part (D), a part (E), or a part (F) as follows on a surface machined by the machine tool:
   (A) a vertical level difference part having a vertical level difference and flat surfaces arranged on both sides of the vertical level difference;
   (B) a direction reversing part at which a direction of movement of the machine tool in a height direction is reversed when the machine tool is used for machining of a three-dimensional object including a curved surface;
   (C) a corner part at which a direction of movement of the machine tool changes;
   (D) a flat surface part;
   (E) a boundary part between a flat surface and a curved surface with a changing curvature;
   (F) a curved surface part having a curved surface with a changing curvature; and
   (G) a curved surface part at which command points are aligned regularly between adjacent tool paths on a curved surface,
   wherein the curved surface of at least one of the part (B) or the part (G) includes a cut spherical body part, and the at least one of the part (B) or the part (G) is included in the cut spherical body part, a ring-shaped reference surface for a three-dimensional pleasuring machine is arranged around the cut spherical body part, and at least one of the at least one of the part (A), the part (C), the part (D), the part (E), or the part (F) is arranged outside the ring-shaped reference surface,
   wherein at least one surface separates the flat surfaces of the vertical level difference of the part (A) from the ring-shaped reference surface, at least one surface separates surfaces forming the part (C) from the ring-shaped reference surface, and the part (D) and the ring-shaped reference surface are free from overlap and parallel, and
   wherein the ring-shaped reference surface has a constant width and is parallel to a bottom surface of the evaluation work piece.

2. The evaluation work piece according to claim 1, wherein the cut spherical body part is arranged in a central area of the evaluation work piece.

3. The evaluation work piece according to claim 1, wherein the evaluation work piece is configured using a rectangular substrate, and the part (C) is arranged at a corner of the rectangular substrate.

4. The evaluation work piece according to claim 1, wherein the part (D) is arranged along an exterior of the evaluation work piece.

5. The evaluation work piece according to claim 1, wherein the part (G) has a polyhedron pattern formed therein.

6. An evaluation work piece for evaluating the influence of at least one factor of a machining program, a numerical controller, a servo controller, a tool, and machining conditions, on machining by a machine tool,
   the evaluation work piece comprising at least one of a pair of parts as follows on a surface machined by the machine tool, each pair having at least one concavo-convex shape part and an inverted shape part having a concavo-convex shape inverted from the concavo-convex shape part,
   wherein the at least one pair of parts comprise: (A) rectangular groove and rectangular projection each forming vertical level difference parts having a vertical level difference on at least two adjacent sides of the rectangular groove and rectangular projection and flat surfaces arranged on both sides of each of the vertical level differences; (B) an inside corner part and outside corner part, each at which direction of movement of the machining tool changes; and (C) a concave curved surface part and a convex curved surface part, each having a curved surface with a changing curvature,
   wherein the at least one pair of the parts (A), (B) or (C) are arranged symmetrically about a reference line on a surface of a substrate and are the same size.

* * * * *